US008285779B2

(12) United States Patent
Acharya et al.

(10) Patent No.: US 8,285,779 B2
(45) Date of Patent: Oct. 9, 2012

(54) PROGRAMMABLE PRESENCE VIRTUALIZATION

(75) Inventors: Arup Acharya, Nanuet, NY (US);
Nilanjan Banerjee, West Bengal (IN);
Dipanjan Chakraborty, Kolkata (IN);
Koustuv Dasgupta, New Delhi (IN);
Archan Misra, Irvington, NY (US);
Xiping Wang, Putnam Valley, NY (US);
Charles P. Wright, Cortland Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 12/701,793

(22) Filed: Feb. 8, 2010

(65) Prior Publication Data
US 2011/0196913 A1    Aug. 11, 2011

(51) Int. Cl.
*G06F 15/16* (2006.01)
*G06F 15/173* (2006.01)
(52) U.S. Cl. ............................ 709/203; 709/238
(58) Field of Classification Search .................. 709/203, 709/204, 217–219, 224, 227; 707/831
See application file for complete search history.

(56) References Cited

U.S. PATENT DOCUMENTS

| 6,148,328 | A  | 11/2000 | Cuomo |
| 6,651,050 | B2 | 11/2003 | Shafrir |
| 6,898,565 | B2 | 5/2005  | Bubb |
| 7,110,783 | B2 | 9/2006  | Bahl |
| 7,243,149 | B2 | 7/2007  | Kelley |
| 7,660,898 | B2 * | 2/2010 | Mueller et al. ............ 709/227 |
| 7,957,373 | B2 * | 6/2011 | Ku et al. .................. 370/389 |
| 2002/0116497 | A1 | 8/2002 | Tung |
| 2003/0154293 | A1 | 8/2003 | Zmolek |
| 2003/0217098 | A1 | 11/2003 | Bobde |
| 2005/0175021 | A1 | 8/2005 | Ozugur |
| 2005/0235038 | A1 | 10/2005 | Donatella |
| 2005/0289097 | A1 * | 12/2005 | Trossen et al. ............ 707/1 |

(Continued)

FOREIGN PATENT DOCUMENTS
JP      2006333446    7/2006

OTHER PUBLICATIONS

Chakraborty et al., "Efficient Querying and Resource Management Using Distributed Presence Information in Converged Networks," 7th International Conference on Mobile Data Managem.

(Continued)

*Primary Examiner* — Ario Etienne
*Assistant Examiner* — Sargon Nano
(74) *Attorney, Agent, or Firm* — Ryan, Mason & Lewis, LLP

(57) ABSTRACT

Techniques for supporting a presence virtualization query are provided. The techniques include receiving a virtual query from a client, the virtual query specified in terms of a membership set of members, wherein the membership set comprises a list of presentity uniform resource identifiers (URIs) and a separate transformation function, defined over a set of presence documents of the members in the membership set, redirecting the query to a destination virtual presentity URI whose presence state comprises an aggregation of the presence documents of the list of URIs in the membership set and a corresponding query element (QE) object that manages subscriptions for the URI, adding the client as a watcher for the destination virtual presentity URI, and applying transformation logic specified by the watcher client and notifying a corresponding client of a resulting output.

22 Claims, 13 Drawing Sheets

U.S. PATENT DOCUMENTS

| | | | |
|---|---|---|---|
| 2006/0047782 A1 | 3/2006 | Niemi | |
| 2006/0117050 A1 | 6/2006 | John et al. | |
| 2006/0167978 A1 | 7/2006 | Ozugur | |
| 2006/0195587 A1 | 8/2006 | Cadiz | |
| 2006/0262917 A1 | 11/2006 | Marsico | |
| 2007/0038723 A1 | 2/2007 | Gourraud | |
| 2007/0055577 A1 | 3/2007 | Ashton | |
| 2007/0124158 A1* | 5/2007 | Kakuta et al. | 705/1 |
| 2007/0168420 A1* | 7/2007 | Morris | 709/204 |
| 2007/0198589 A1 | 8/2007 | Houri | |
| 2008/0108332 A1 | 5/2008 | Tian | |
| 2008/0120409 A1 | 5/2008 | Sun et al. | |
| 2008/0125157 A1 | 5/2008 | Zhang | |
| 2008/0133644 A1* | 6/2008 | Garcia-Martin et al. | 709/202 |
| 2008/0137531 A1 | 6/2008 | Tal-Aviv | |
| 2008/0155476 A1 | 6/2008 | Forbes | |
| 2008/0162637 A1 | 7/2008 | Adamczyk | |
| 2008/0183866 A1* | 7/2008 | Maeda et al. | 709/224 |
| 2008/0249997 A1* | 10/2008 | Sun et al. | 707/3 |
| 2009/0005038 A1* | 1/2009 | Yasrebi et al. | 455/435.1 |
| 2009/0070410 A1* | 3/2009 | Gilfix et al. | 709/203 |
| 2009/0070419 A1* | 3/2009 | Gilfix et al. | 709/204 |
| 2009/0094330 A1* | 4/2009 | McQuaide et al. | 709/205 |
| 2009/0150403 A1* | 6/2009 | Jerome et al. | 707/10 |
| 2009/0154451 A1* | 6/2009 | Ku et al. | 370/389 |
| 2009/0154452 A1* | 6/2009 | Ku et al. | 370/389 |
| 2009/0177729 A1* | 7/2009 | Ben Ezra et al. | 709/202 |
| 2010/0077018 A1 | 3/2010 | Acharya | |

OTHER PUBLICATIONS

O'Neill et al. "Add SIP to Your Contact Center and Create a Breakthrough Customer Experience," Nortel Networks, White Paper, Mar. 2006, 8 pages.

Banerjee et al. "Peer-to-Peer Instant Messaging and Presence Services Over Wireless Ad Hoc Networks," IBM Research Report, RC23289, Computer Science, Aug. 2004, pp. 1-7.

Day et al., "A Model for Presence and Instant Messaging," Network Working Group, RFC 2778, Feb. 2000, 14 pages.

Jorns et al., "A Privacy Enhancing Mechanism based on Pseudonyms for Identity Protection in Location-Based Services," Australian Computer Society, Proceedings of the Fifth Australasian Symposium on ACSW frontiers, 2007, pp. 133-142, vol. 68.

Gehlot et al., "A Formalized and Validated Executable Model of the SIP-Based Presence Protocol for Mobile Applications," ACMSE, Mar. 2007, pp. 185-190, North Carolina.

Bartram et al., "Designing Portable Collaborative Networks," Colligo Networks, ACMQUEUE, May 2003, pp. 41-49. vol. 1, No. 3.

J. Rosenberg, "Extensible Markup Language (XML) Formats for Repressing Resource Lists," RFC 4826, Network Working Group, Standards Track, May 2007, pp. 1-31.

Roach, RFC 3265: Session Initiation Protocol (SIP)-Specific Event Notification.

NIEMI. RFC 3903: Session Initiation Protocol (SIP) Extension for Event State Publication.

Belinsky, et al, Pasta: Deriving Rich Presence for Converged Telecommunications Network Applications, COMSWARE 2007.

Truong et al., "ESCAPE—an Adaptive Framework for Managing and Providing Context Information in Emergency Situations", Proceedings of EuroSSC, pp. 207-222, 2007.

Sugano et al., "Presence Information Data Format (PIDF)", In RFC 3863, Aug. 2004.

Schulzrinne, "RPIDS Rich Presence Information Data Format for Presence Based on the Session Initiation Protocol (SIP)", Internet-Draft—draft-schulzrinne-simple-rpids-02.ps, Columbia U., Feb. 2003.

Saint-Andre, "Extensible Messaging and Presence Protocol (XMPP): Instant Messaging and Presence", In RFC 3921, IETF, Oct. 2004.

Roach et al., "A Session Initiation Protocol (SIP) Event Notification Extension for Resource Lists", In RFC 4662, IETF, Aug. 2006.

Rosenberg et al., "SIP: Session Initiation Protocol", In RFC 3261, IETF, Jun. 2002.

Rosenberg, "A presence event package for the session initiation protocol (SIP)", In RFC 3856, IETF, Aug. 2004.

Reichle et al., "A Context Query Language for Pervasive Computing Environments", Proceedings of the 2008 Sixth Annual IEEE International Conference on Pervasive Computing and Communications, 2008.

Peterson, "A Presence-based GEOPRIV Location Object Format", In RFC 4119, Dec. 2005.

Mahy et al., "A Document Format for Filtering and Reporting Location Notications in the Presence Information Document Format Location Object (PIDF-LO)", Internet-Draft—draft-ietf-geopriv-loc-filters-03, Neustar, Nov. 2008.

Grine et al., "Self-adaptation of a query service using reconfigurable components", Proceedings of IEEE 24th International Conference on Data Engineering Workshop (ICDEW), pp. 145-151, 2008.

Fernandez et al., "YooHoo! Building a Presence Service with XQuery and WSDL", Proc. ACM SIGMOD International Conference on Management of Data, Jun. 2004.

Chen et al., "Context Aggregation and Dissemination in Ubiquitous Computing Systems", Proceedings of the Fourth IEEE Workshop on Mobile Computing Systems and Applications, 2002.

Cohen et al., "Composing Pervasive Data Using iQL", Proceedings of Fourth IEEE Workshop on Mobile Computing Systems and Applications (WMCSA), 2002.

Bergmann, A framework for aggregation of presence information based on user provisioned rules, Ph.D. Thesis, 2007.

Bergmann et al., "A Script-based Approach to Distributed Presence Aggregation", Proceedings of the IEEE WirelessCom Conference, USA, Jun. 2005.

Bardram, "The JAVA context awareness framework (jcaf)—a service infrastructure and programming framework for contextaware applications," Proceedings of PERVASIVE 2005, LNCS Springer, Heidelberg, 2005.

Amini et al., "SPC: A Distributed, Scalable Platform for Data Mining", SIGKDD 2006 Workshop on Data Mining Standards, Services, and Platforms. Aug. 2006.

Abadi et al., "Aurora: A New Model and Architecture for Data Stream Management", VLDB Journal, vol. 2, No. 2, pp. 120-139, Aug. 2003.

"Virtual Presence Server", U.S. Appl. No. 12/233,795, filed Sep. 19, 2008.

"Methods and Apparatus for Dynamic Generation and Notification of Virtual Presentities for Presence-Based Awareness", U.S. Appl. No. 11/954,141, filed Dec. 11, 2007.

* cited by examiner

PROGRAMMABLE PRESENCE VIRTUALIZATION

FIELD OF THE INVENTION

Embodiments of the invention generally relate to information technology, and, more particularly, to the field of presence.

BACKGROUND OF THE INVENTION

While initially developed as a means for communicating the online status in instant messaging applications, presence has become a key enabler of Web-based content to provider, enterprise and service provider/telecom converged applications. Presence can also be used as a method of representing and querying the context of an individual, both physical (for example, a user's location) and virtual (for example, the status of avatars in a gaming context). Moreover, presence is used to represent the dynamic attributes of not just individuals, but also devices (for example, the battery level of a cellphone) and abstract entities (for example, the number of attendees in a conference call). Presence may be broadly described as a publish-subscribe system for context that enables a variety of products and applications. As such, presence embodies the first practical, large-scale adoption of context-aware computing.

With the proliferation of presence, an individual's contextual state is increasingly fragmented across different applications and provider domains. Presence-based applications operate in domain-specific silos, unaware of the individual's presence status in other domains. Obfuscating these traditional barriers between communications service providers, enterprises and Internet content providers would, however, enable a significantly more unified and accurate view of an individual's presence attributes across multiple domains. More generally, future converged applications not only require the presence status from multiple sources/domains, but also effectively operate over derived contextual attributes by applying some processing logic over the raw presence information.

A limited number of existing approaches have been suggested to overcome this limitation. Broadly, they require the presence server to be enhanced to accept programmatic specifications on the computing logic and to instantiate such computing logic on the presence server or an adjunct engine. These approaches, however, suffer from one of the following drawbacks: a) they do not prescribe a standardized way by which computing logic can be specified; b) they do not enable the specification of client computing logic to easily utilize the existing computing logic already instantiated in the presence server or an adjunct server; or c) they do not allow the adjunct server to efficiently utilize the presence infrastructure and mechanisms to respond to such programmatic queries.

SUMMARY OF THE INVENTION

Principles and embodiments of the invention provide techniques for programmable presence virtualization. An exemplary method (which may be computer-implemented) for supporting a subscription-style presence virtualization query, according to one aspect of the invention, can include steps of receiving a virtual query from a client, the virtual query specified in terms of a membership set of members, wherein the membership set comprises a list of presentity uniform resource identifiers (URIs) and a separate transformation function, defined over a set of presence documents of the members in the membership set, redirecting the query to a destination virtual presentity URI whose presence state comprises an aggregation of the presence documents of the list of URIs in the membership set and a corresponding query element (QE) object that manages subscriptions for the URI, adding the client as a watcher for the destination virtual presentity URI, and applying transformation logic specified by the watcher client and notifying a corresponding client of a resulting output.

One or more embodiments of the invention or elements thereof can be implemented in the form of a computer product including a tangible computer readable storage medium with computer useable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
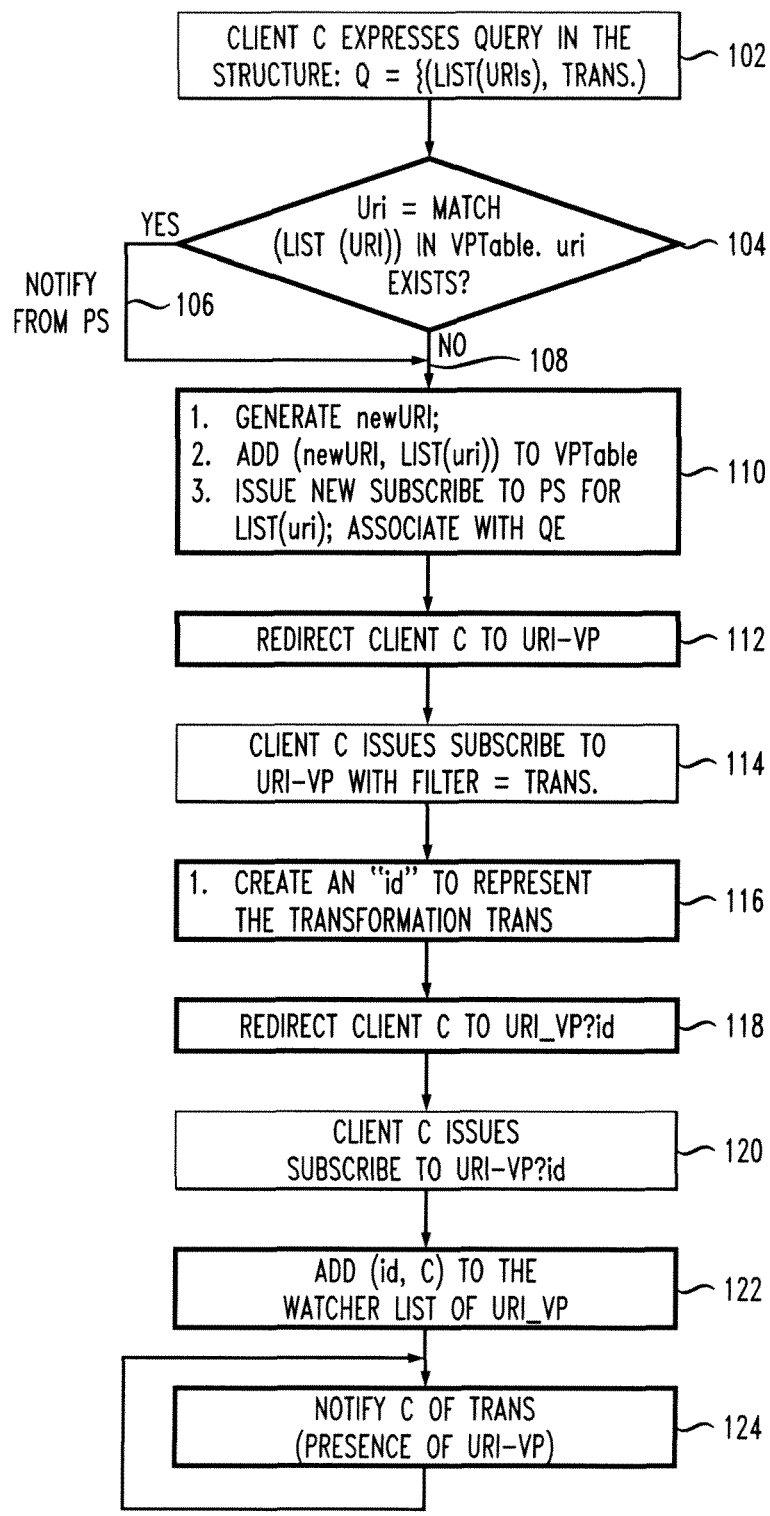
FIG. 1 is a diagram illustrating presence virtualization techniques with second recognition, according to an embodiment of the present invention.

Principles of the invention include efficient presence virtualization for structured virtualization queries, as well as programmable presence virtualization for next-generation context-based applications. One or more embodiments of the invention include representing a query as a user-supplied logic (to answer the query) along with associated presentities (on whom to operate the query) encapsulated as a (virtual) presentity itself that other presentities can subscribe to (just like any other subscription). Presence can be broadly defined as the ability to receive dynamic notifications of a variety of attributes of other devices, persons or activities. As noted above, there exists no standardized technique in existing approaches for a client to specify some form of transformative logic on the presence documents of multiple application programming interfaces (APIs) to a server, and to be able to simply receive the output of the transformation.

Currently, with existing approaches, if a client wishes to derive some 'state' based on the presence status of multiple presentities, the client must explicitly retrieve the presence document of each presentity, and then perform the necessary combining itself. Accordingly, existing uses of context do not provide a programmable mechanism for rapid creation of context-aware services. One or more embodiments of the invention, in contrast, include a presence virtualization architecture, where a Virtualized Presence Server (VPS) receives customizable queries from multiple presence clients, retrieves the necessary data from the base presence servers, applies the required virtualization logic and notifies the presence clients. To support both query expressiveness and computational efficiency, virtualization queries are structured to separately identify both the extensible stylesheet language transformation- (XSLT)-based transformation primitives and the presence sources over which the transformation occurs. For improved scalability, one or more embodiments of the invention offload the XSLT-related processing to a high-performance extensible markup language (XML) processing engine.

As detailed herein, one or more embodiments of the invention include building a presence virtualization layer. Such a virtualization layer provides a programmable abstraction by which applications can easily obtain their desired collective "view" of presence by querying a server-side overlay, without focusing on the details of individual presentities. As also described herein, challenges that are not addressed by existing approaches include query flexibility and scalability.

With respect to query flexibility, because virtualization is a common service spanning multiple presence applications, the client programming model must be expressive enough to support a wide variety of virtualization queries (for example, both a query that computes the percentage of available call-center employees, as well as another application that monitors the number of free taxicabs within a mile of a train station). With respect to scalability, given the high volumes of presence updates and queries to be expected in tier-1 service provider and enterprise environments, one or more embodiments of the invention can control both the network traffic (in terms of presence updates and notifications) and the server processing (in terms of both subscriptions and the aggregation logic) loads. Scalable virtualization is critical, for example, to a telecom service provider that injects a unique set of presence attributes into a larger federated presence eco-system (for example, a cellular provider supplying real-time location of an user to an internet services provider for use in location-aware advertising).

As such, the techniques described herein include a programmable presence virtualization solution based on the ability to apply user-specific customized processing logic on a potentially large set of dynamically changing XML documents. The concept of presence virtualization is intimately linked with manipulation of XML streams, as the presence status for different objects can be represented via XML-based schemas. Virtualization thus allows a presence client to "programmatically push" its application-specific logic, for deriving composite presence state (from the presence-related attributes of multiple individual presentities) onto the back-end server infrastructure. This ability to combine the application of such logic from multiple clients promotes scalability by reducing both the subscription load on individual presence servers and the presence traffic load on the network.

Moreover, one or more embodiments of the invention also allow clients to expose and share the end results of their transformations with other relevant clients. In effect, virtualization allows presence consumers to define virtual presentities (presentities created in response to external queries), which become a seamless part of the presence infrastructure and are functionally indistinguishable from the 'raw' presentities. The techniques detailed herein additionally address potential bottlenecking challenges by appropriate offloading of the more complex aspects of XML manipulation to a product-grade XML acceleration engine.

One or more embodiments of the invention additionally include detailing the implementation and design of the VPS, with emphasis on a) how client queries are structured and specified, b) how virtual presentities and dynamically generated session initiation protocol (SIP) uniform resource identifiers (URIs) can be coupled with standard SIP redirection mechanisms to allow presence clients to reuse the offloaded computation logic at different granularities, and (c) how the offloaded computation may be efficiently performed at a VPS through appropriate coordination of pipelined or parallelized XML transformations on a commercial XML acceleration engine.

The techniques described herein include the use of a structured query, where the set of presentities over which the query transformation is computed is explicitly demarcated. Moreover, one or more embodiments of the invention include the VPS creating a single virtual presentity (for example, a URI) to represent the aggregation of the individual presentities such that multiple queries (from multiple clients) can reuse the same virtual presentity URI. This approach views the query as the application of some transformation or filters on an underlying, virtual presentity URI, and promotes more efficient management of subscriptions between the VPS and the presence server (PS).

One or more embodiments of the invention include requiring a client's virtual presence query logic be specified as two distinct components—one part identifying the set of presentities over which the logic is applied, and the second part specifying the logic—to a virtual presence server. Additionally, this composition logic can be processed as a filtering or transformation operation over a dynamically created presentity (URI) that represents the aggregation of the individual presentities, such that multiple queries operating on an identical set of presentities are associated with a common dynamic presentity URI. Further, one or more embodiments of the invention include applying the computation at the VPS whenever the aggregated content of the dynamically created virtual presentity is updated, and returning the results to the individual clients.

On receiving a request, the VPS can make necessary subscriptions to the presence server (if a prior subscription does not exist), set-up the computational elements to operate over the presence documents retrieved from the presence server and apply these computational elements over the presence documents notified by the presence server. The VPS can also maintain in a cache the information from prior notifications needed to process incoming notifies from the presence server. After the computation has been applied, the VPS can notify the client of the computed presence state.

As also detailed herein, the output of sending a query is a creation of a virtual presentity (virtual resource) that represents query execution, and results from the (ongoing) query execution is sent back as a notification to the query-sender, thus keeping in line with SIP's subscribe/notify philosophy. As such, user subscription poses the query, processing of the subscribe leads to creation of a virtual resource, the user is re-subscribed to this virtual resource, and notifications resulting from this subscription contain answers to the originally posed query. Moreover, the transformation function in one or more embodiments of the invention represents any computation (not just a list as a response) on the virtual presentity that can be expressed by any well-known XML-manipulating language.

Additionally, the techniques described herein can include characterizing structured queries so that the logic of a query element (QE) managing a particular virtual presentity URI queries can be automatically installed on the virtual presence server. Also, by structuring the queries, one or more embodiments of the invention promote re-use of the data-set on which the queries operate, thus effectively promoting re-use of data-set obtained from the presence server and group-list server (XDMS).

FIG. 1 is a diagram illustrating presence virtualization techniques with second redirection, according to an embodiment of the present invention. By way of illustration, FIG. 1 depicts techniques to create presence-based steps and methods. In the architecture of one or more embodiments of the invention, a client submits a subscription request to a virtual presence server (step 102). This request is explicitly structured to separate out a listing of the set of URIs (presentities) over whose presence documents the query applies (this set may be called the membership set) and the actual transformation logic (expressed as a set of operators belonging to one or more of well-established query or transformation languages) over the members of the membership set. By way of example, the membership set and the transformation itself can be an EXtensible Stylesheet Language- (XSL)-style sheet that generates the element "both-present=true" only if the availability field of each individual presence document was set to 'true.'

Upon receipt of the request, the virtual presence server determines if a virtual URI already exists for the set of URIs specified in the membership set (step 104). This can be performed via a lookup in an associated table, referred to herein as the VPTable, and which stores the list of previously created virtual presentity URIs (VP-URIs) and the corresponding set of underlying URIs. Note that the VPS is not trying to find identical existing queries (that would involve finding entries with identical membership sets and transformation functions), but in one or more embodiments of the invention it merely tries to find an identical match in the membership set. If such a match is found, then in step 106, the virtual presence server redirects the client to the existing URI (VP-URI) that logically represents the aggregation of the presentities in the membership set. If not, then via step 108, step 110 includes the VPS assigning a dynamically created URI (VP-new-URI) for this virtual presentity, and setting up the appropriate subscriptions to the PS to retrieve the presence documents for each of these presentities.

The VPS may set up an individual subscription for each presentity in the membership set, or may, for efficiency, define a 'resource list' including all of these URIs, and subscribe to the URI (rls-URI) of the resource list. In addition, the VPS can also add the entry for the newly created VP-new-URI to its internal VPTable, so that this URI may be reused by subsequent queries that have an identical membership set. In addition to setting up these subscriptions, the VPS can also instantiate the computing logic (referred to as query element (QE)) that will be responsible for processing the incoming NOTIFYs (corresponding to the VP-URI) and filtering it before notifying the clients. Note that in one or more embodiments of the invention, the QE elements are assumed to be part of the VPS. As such, the responsibility for manipulating the presence document of the VPS-URI is allocated to each QE. Further, in step 112, the VPS redirects the client to the newly created URI (VP-new-URI).

The client can then redirect its request, in step 114, to the VP-URI provided by the VPS in response to the initial query. This request will get routed to the QE responsible for applying client-specific transforms over the 'aggregated' presence document of the VP-URI. On receiving this request, the QE, via step 116, will create an identifier (id) to represent the 'transformation logic' associated with the client. The VPS, in step 118, can redirect the client to the new URI (VP-URI?id), with the "id" as a parameter over the VP-new-URI. The client will then redirect its request, via step 120, to the VP-URI and pass the transformation id as a parameter to the URI (VP-URI?id). On receiving this request, the QE, in step 122, will add the client to the list of watchers for this presentity and note the transformation id in which the watcher is interested. As used herein, a watcher client can include an entity that tracks who else is tracking that entity's presence.

Additionally, whenever the aggregated presence document of the VP-URI is updated (through one or more NOTIFYs from the PS), the QE component inside the VPS will receive the update, apply the transformation logic for each client in its list of 'watchers' and NOTIFY the client, via step 124, of the resulting output. As such, the client 'transformation' specifications may be viewed as 'filters' applied to the VP-URI presentity. This enables the VPS to utilize one subscription (or set of subscriptions) corresponding to the VP-URI to respond to multiple clients who specify different transformations over the same membership set.

Figure 2:
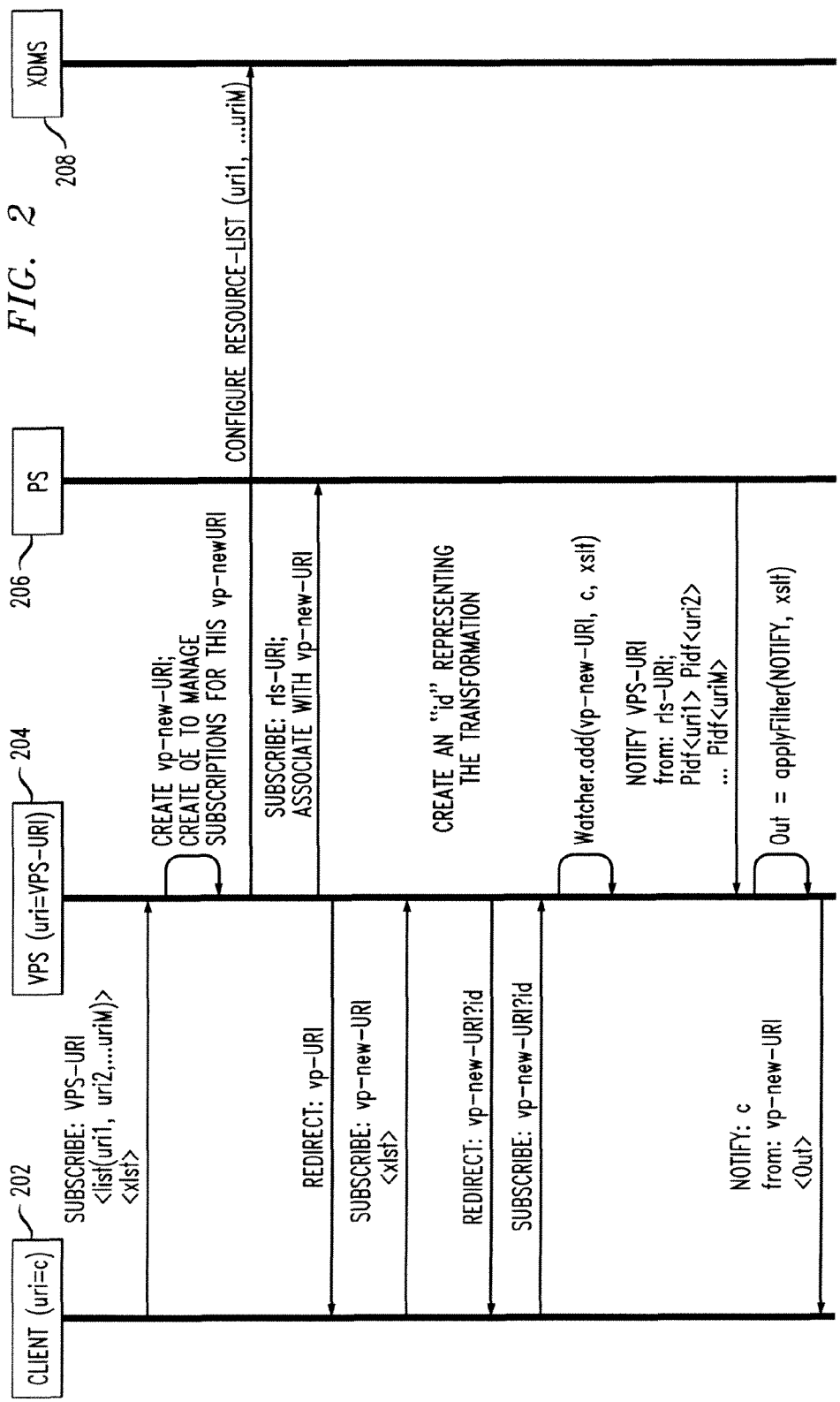
FIG. 2 is a diagram illustrating an exemplary message flow, according to an embodiment of the present invention.

FIG. 2 is a diagram illustrating an exemplary message flow, according to an embodiment of the present invention. By way of illustration, FIG. 2 depicts an exemplary message flow (with a newly created VP and a two-level redirect) for virtualizing the SIP presence message flow. Four entities participate in the exchange: the presence client 202, the virtual presence server 204, an existing presence server 206 and the XML Data Management Server (XDMS) (or Group List Management Server (GLMS)) server 208. In this example, each message in the flow contains a variety of other headers for transaction matching, routing, and other basic SIP functionality.

A presence client 202 can issue its query (a SIP SUBSCRIBE with a tuple list of SIP URIs, a transformation function represented as an XSLT that needs to be applied to the URIs) in the body of a message addressed to the VPS URI 204. If a QE corresponding to the list of URIs exists, the client will be redirected to the QE URI; else, a new QE object will be created on-demand by the VPS (with a dynamically allocated URI VP-new-URI) and appropriate subscriptions will be set-up to the PS to retrieve presence documents of each of the presentities. The query client can be subsequently redirected to the new VP-new-URI. The presence query can be routed by the query router to the Query Receiver module of the QE.

Figure 3:
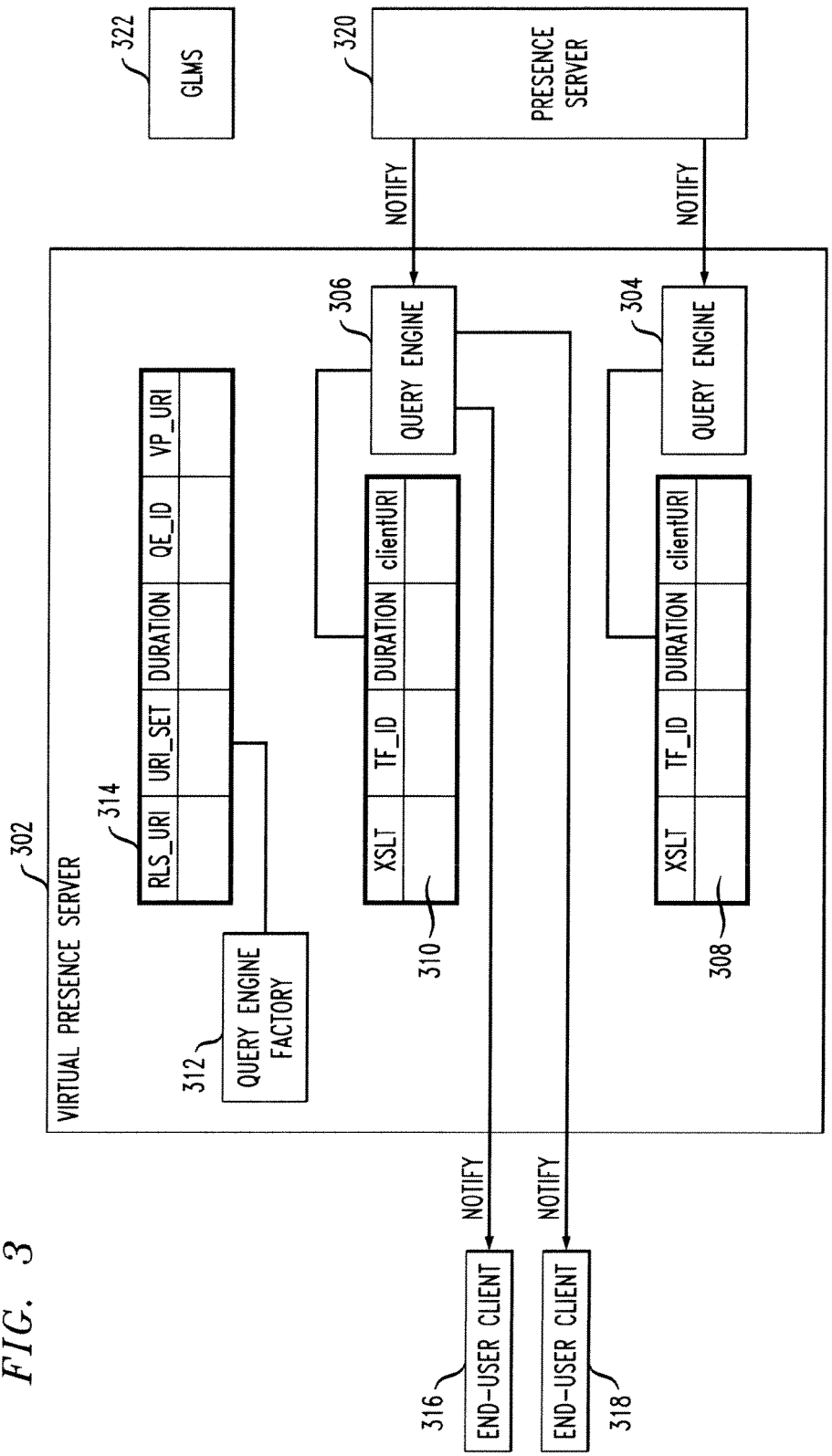
FIG. 3 is a diagram illustrating system components, according to an embodiment of the present invention.

FIG. 3 is a diagram illustrating system components, according to an embodiment of the present invention. By way of illustration, FIG. 3 depicts a virtual presence server (VPS) 302, which includes multiple query engines 304 and 306, respectively. Also VPS 302 includes a query engine factory 312. Input 308 and 310 to the query engine includes an XSLT defining the transformation function that needs to be applies and its identification number TF_ID, along with the presence URI clientURI where a notification needs to be sent back. Similarly, input 314 to the Query Engine Factory contains information about a newly instantiated query (that is, QE_ID) along with the RLS_URI of the presentity set that forms the URIset. Input 314 also contains information about the VP_URI provided by the VPS in response to an initial query.

As also depicted by FIG. 3, presence server 320 sends notifications to query engines 304 and 306, which, in turn, send notifications to end-user clients 316 and 318, respectively. The notification back to the clientURI includes an aggregated presence document that is computed as a result of the transformation function (XSLT) supplied to the query engine. Additionally, FIG. 3 depicts a group list management server (GLMS) 322. The GLMS contains presence information about each individual presentity that forms the URIset.

Figure 4:
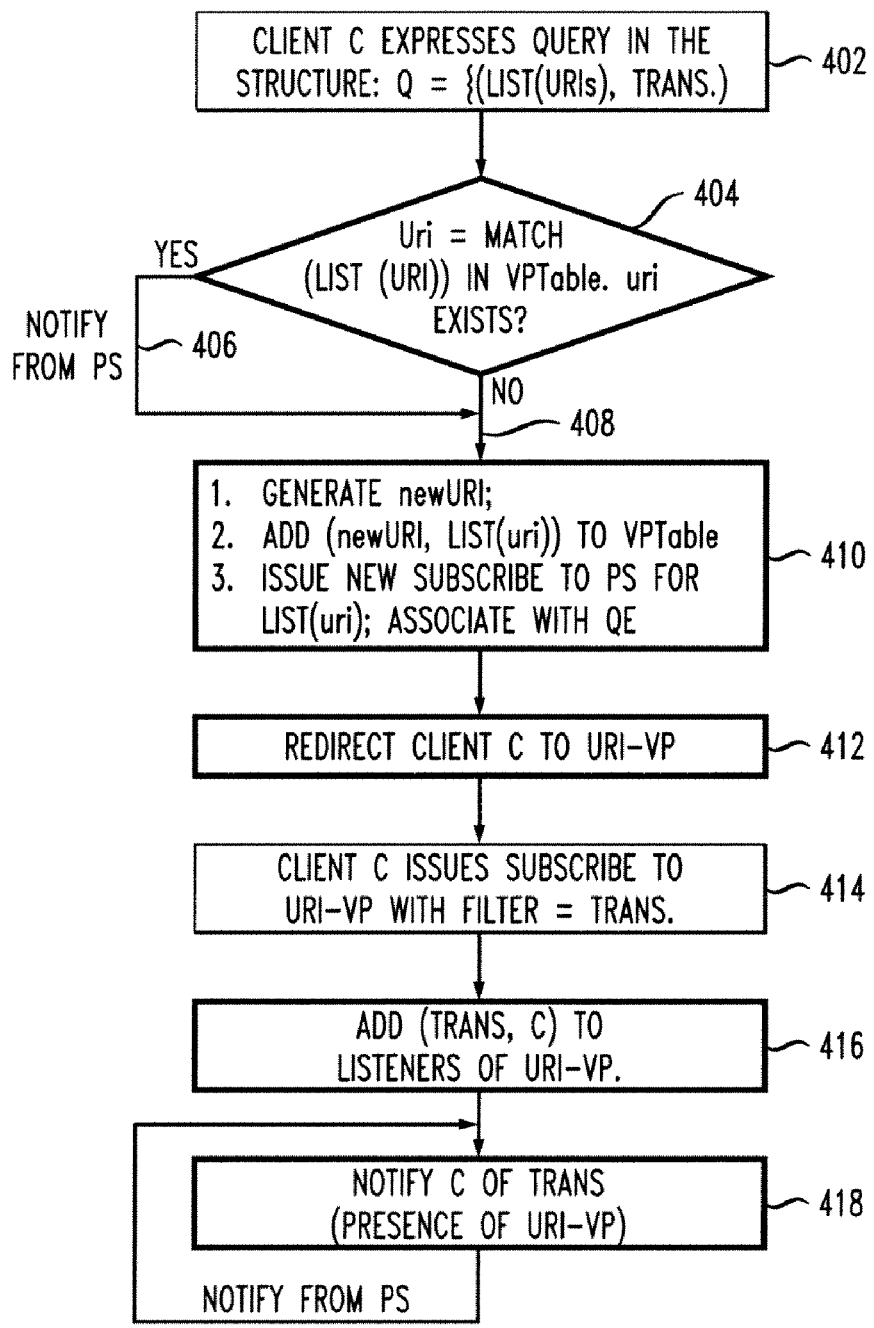
FIG. 4 is a diagram illustrating presence virtualization techniques without a second redirection, according to an embodiment of the present invention.

FIG. 4 is a diagram illustrating presence virtualization techniques without a second redirection, according to an embodiment of the present invention. In the architecture of one or more embodiments of the invention, a client submits a subscription request to a virtual presence server (step 402). This request is explicitly structured to separate out a listing of the set of URIs (presentities) over whose presence documents the query applies (this set may be called the membership set) and the actual transformation logic (expressed as a set of operators belonging to one or more of well-established query or transformation languages) over the members of the membership set. By way of example, the membership set and the transformation itself can be an XSL-style sheet that generates the element "both-present=true" only if the availability field of each individual presence document was set to 'true.'

Upon receipt of the request, the virtual presence server determines if a virtual URI already exists for the set of URIs specified in the membership set (step 404). This can be performed via a lookup in an associated table, referred to herein as the VPTable, and which stores the list of previously created virtual presentity URIs (VP-URIs) and the corresponding set of underlying URIs. Note that the VPS is not trying to find identical existing queries (that would involve finding entries with identical membership sets and transformation functions), but in one or more embodiments of the invention it merely tries to find an identical match in the membership set. If such a match is found, then in step 406, the virtual presence server redirects the client to the existing URI (VP-URI) that logically represents the aggregation of the presentities in the membership set. If not, then via step 408, step 410 includes the VPS assigning a dynamically created URI (VP-new-URI) for this virtual presentity, and setting up the appropriate subscriptions to the PS to retrieve the presence documents for each of these presentities.

The VPS may set up an individual subscription for each presentity in the membership set, or may, for efficiency, define a 'resource list' including all of these URIs, and subscribe to the URI (rls-URI) of the resource list. In addition, the VPS can also add the entry for the newly created VP-new-URI to its internal VPTable, so that this URI may be reused by subsequent queries that have an identical membership set. In addition to setting up these subscriptions, the VPS can also instantiate the computing logic (referred to as query element (QE)) that will be responsible for processing the incoming NOTIFYs (corresponding to the VP-URI) and filtering it before notifying the clients. Note that the QE elements are assumed to be part of the VPS. As such, the responsibility for manipulating the presence document of the VPS-URI is allocated to each QE. Further, in step 412, the VPS redirects the client to the newly created URI (VP-new-URI).

The client can then redirect its request, in step 414, to the VP-URI provided by the VPS in response to the initial query. This request will get routed to the QE responsible for applying client-specific transforms over the 'aggregated' presence document of the VP-URI. On receiving this request, the QE, in step 416, will add the client to the listeners for this presentity. Additionally, whenever the aggregated presence document of the VP-URI is updated (through one or more NOTIFYs from the PS), the QE component inside the VPS will receive the update, apply the transformation logic for each client in its list of listeners and NOTIFY the client, via step 418, of the resulting output.

Figure 5:
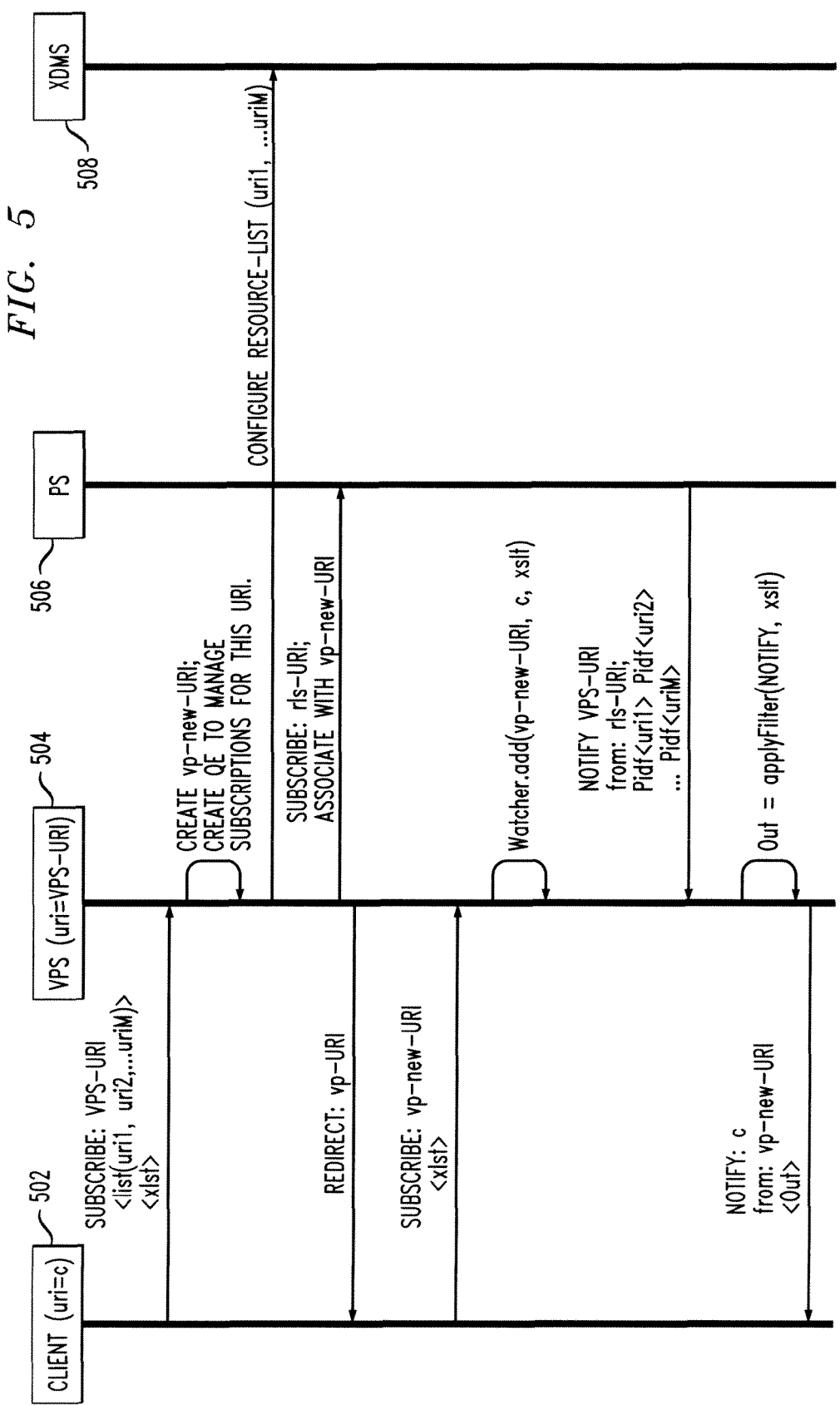
FIG. 5 is a diagram illustrating an exemplary message flow, according to an embodiment of the present invention.

FIG. 5 is a diagram illustrating an exemplary message flow, according to an embodiment of the present invention. By way of illustration, FIG. 5 depicts an exemplary message flow with one-level redirect. Four entities participate in the exchange: the presence client 502, the virtual presence server 504, an existing presence server 506 and the XDMS (or GLMS) server 508. FIG. 5 depicts a sequence of steps that are followed by the VPS from the time of initializing a new query through a SUBSCRIBE to a VPS_URI, to the creation of a new vp-new-URI with the appropriate subscriptions to the base XDMS, and the notification back to the clientURI with a aggregated presence information data format (PIDF) that contains the result of applying the transformation/filter (XSLT).

Figure 6:
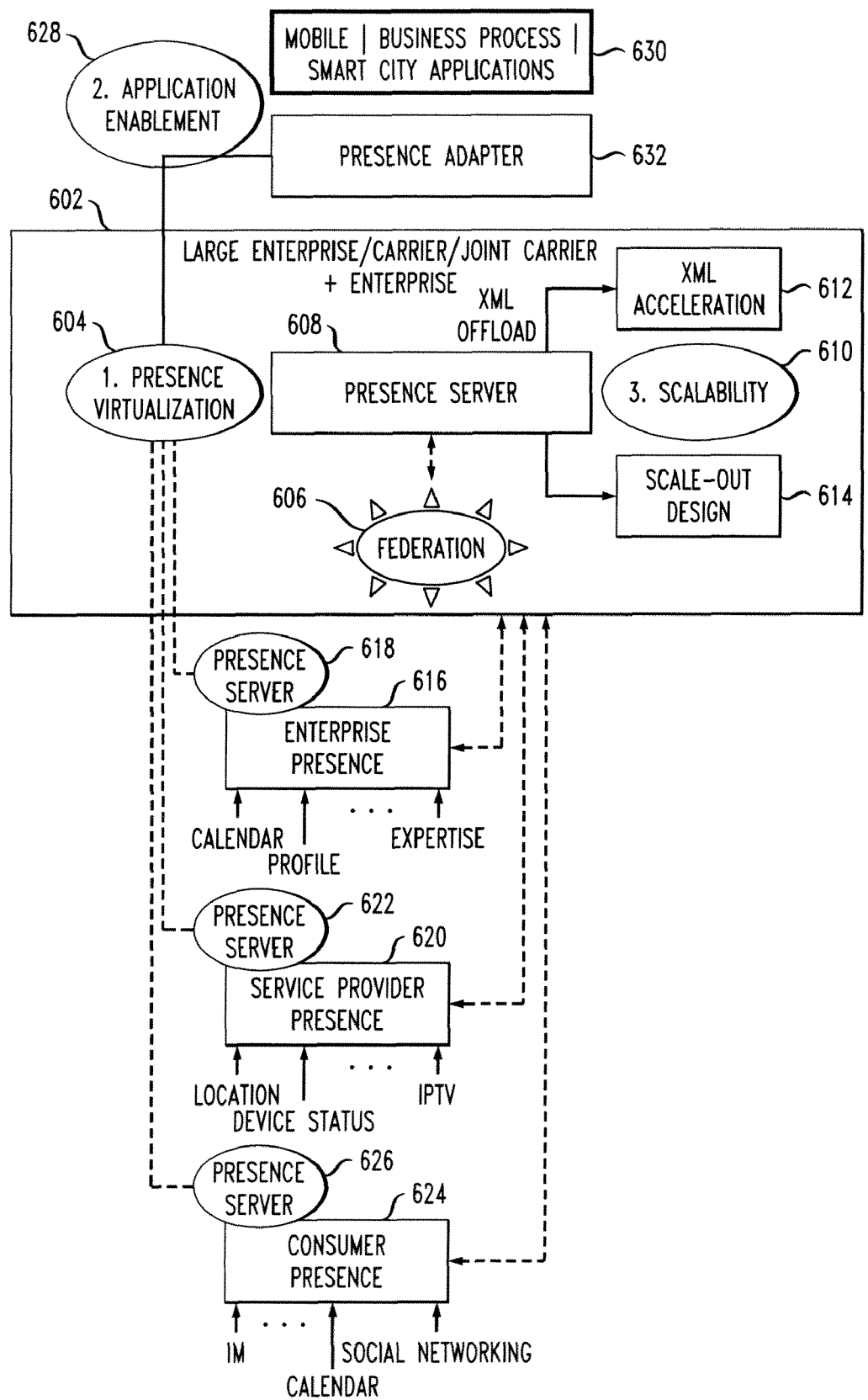
FIG. 6 is a diagram illustrating high-level presence virtualization architecture, according to an embodiment of the present invention.

FIG. 6 is a diagram illustrating high-level presence virtualization architecture, according to an embodiment of the present invention. By way of illustration, FIG. 6 depicts an enterprise (or carrier or joint carrier/enterprise) 602, which includes a presence virtualization component 604, a federation component 606, a presence server 608, a scalability component 610, an XML acceleration component 612 and a scale-out design component 614. The presence server 608 offloads XML to the XML acceleration component 612 and the scale-out design component 614.

Additionally, the enterprise 602 interacts with an enterprise presence component 616 (which can include input from a calendar, a profile, expertise, etc.), a service provider presence component 620 (which can include input from location information, device status, Internet protocol television (IPTV), etc.) and a consumer presence component 624 (which can include input from instant messenger (IM), a calendar, social networking, etc.). Also, in connection with these components, presence servers 618, 622 and 626 provide input to the presence virtualization component 604.

Further, FIG. 6 depicts an application enablement component 628, which interacts with the presence virtualization component 604, an applications (for example, mobile, business process, smart city, etc.) component 630 and a presence adapter 632 that can receive events from multiple presence-enabled applications and publish this information to the presence server.

As depicted in FIG. 6, a presence virtualization component 604 can include programmable infrastructure to enable higher-level, query-like, abstraction for using presence. A federation component 606 can include distributing presence information across environments, applications and devices. Additionally, a scalability component 610 can include ease of (re)-use, wherein queries can be re-used and built upon existing queries, further including a number of presence sources, queries, presence updates, as well as XML processing capabilities. Also, one or more embodiments of the invention include separation of a programmable, scalable platform from specific use-case (for example, context-aware mobility services). As such, the techniques detailed herein include the ability to create customized presence applications combining expertise, availability, location, etc.

Presence virtualization can provide a semantically-useful abstraction over the underlying heterogeneous infrastructure. By way of example, it is conceptually equivalent to the notion of "views" in database systems, which define custom abstractions over underlying physical tables. In one or more embodiments of the invention, the central element in the architecture is the virtualized presence server (VPS), which is responsible for accepting complex presence queries from clients and responding with the appropriate "virtual presentity" status.

A virtualization layer can include a set of VPS-es, which effectively shield the presence clients from the individual presentities managed by the underlying presence servers (PS). Each individual VPS may itself issue subscriptions to multiple underlying PS-es, potentially via the use of different presence protocols. Each VPS supports multiple presence "queries," and to support efficiency, each VPS performs query optimization across the queries to essentially avoid redundant computations.

In one or more embodiments of the invention, each client wishing to avail of or instantiate a virtualized presentity on the VPS can specify its logic in a prescribed format that is both sufficiently expressive and permits efficient implementation in the VPS run-time. With the PS providing presence content in XML-based formats, the manipulation logic can be based on one of the various XML manipulation languages (such as, for example, XSLT).

To promote query expressiveness with efficient query reuse capabilities, one or more embodiments of the invention include formulating each query as including two distinct parts, a membership set (MS) and a transformation function (TF). A MS identifies the set of underlying presentities (either as an explicit list of individual pre-existing SIP URIs or via a group URI corresponding to a resource list) whose information is utilized to define different attributes of the virtualized presentity. As such, the MS identifies the set of underlying presentities whose presence state is relevant to the posed query. A TF specifies a transformation (a sequence of operators) that is applied to the set of presence documents of the MS members to generate the response to the virtualization query.

Each virtualized presence query issued by a client can thus be uniquely identified by the tuple (MS. TF). Multiple queries may be equal in either one or both elements of the tuple. Also, this explicit separation of MS and TF components enables the VPS to efficiently exploit the commonality among MS elements of different queries.

In one or more embodiments of the invention, the TF component of the query is specified as an XSLT transformation over the XML contents of the presence documents. XSLT can he used, for example, due to both its expressiveness, and the advanced vendor-specific XSLT support provided by a variety of XML processing appliances. To maintain consistency with the base SIP signaling infrastructure, the queries can be carried as XML bodies in the Payload field of SIP SUBSCRIBE messages. These SUBSCRIBE messages are routed to the VPS, which is then responsible for extracting and processing the encased query.

Figure 7:
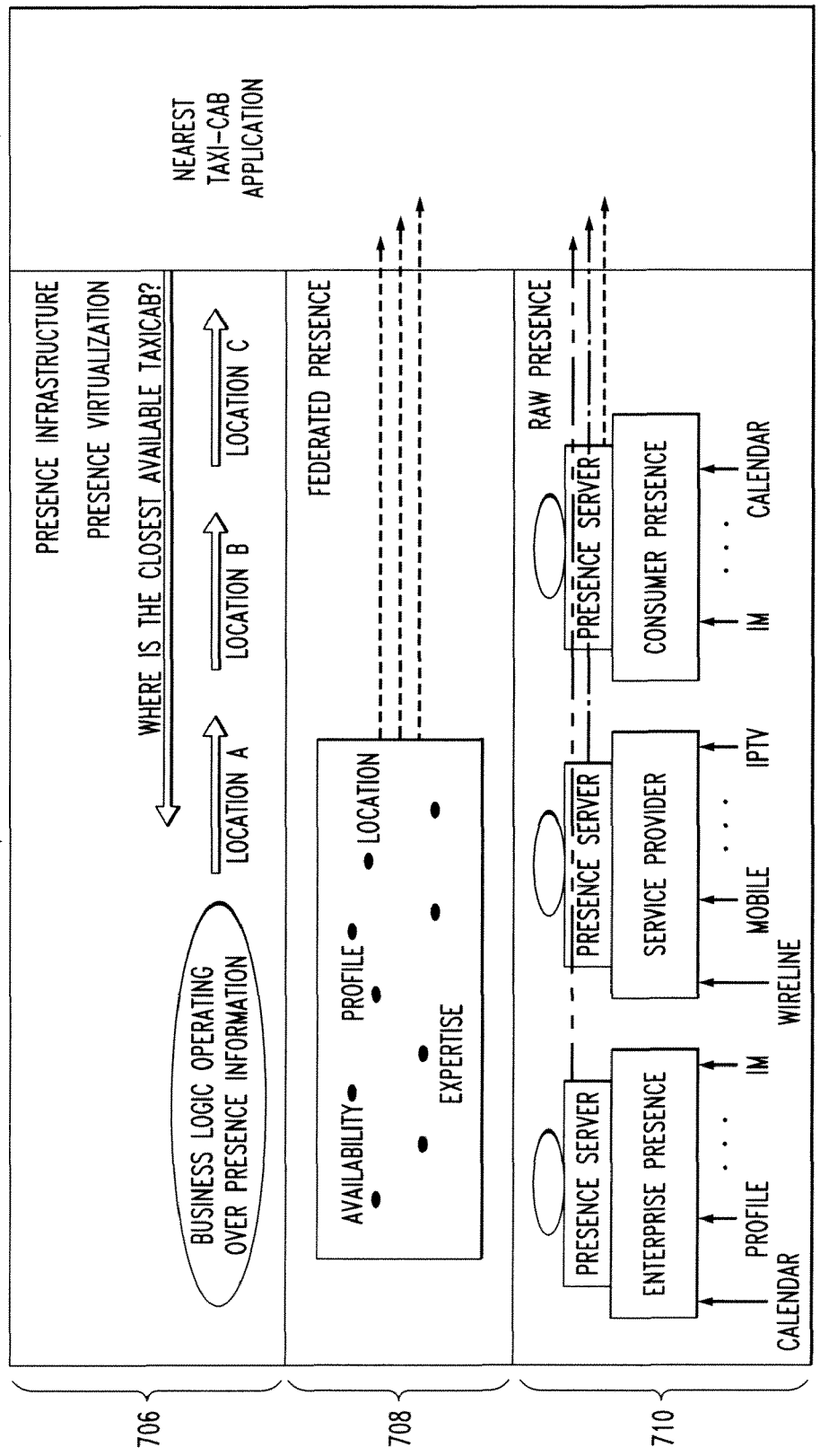
FIG. 7 is a diagram illustrating an example detailing the concept of presence virtualization, according to an embodiment of the present invention.

FIG. 7 is a diagram illustrating an example detailing the concept of presence virtualization, according to an embodiment of the present invention. By way of illustration, FIG. 7 depicts presence infrastructure 702 and a nearest taxi-cab application 704. The presence infrastructure 702 includes a presence virtualization component 706, a federated presence component 708 and a raw presence component 710. As depicted via FIG. 7, one or more embodiments of the invention can include the example of a user receiving notifications about the location of the nearest and available taxicab.

An application developer needs to send only a high-level query to the presence virtualization engine/component 706. A presence subscription implies a long-running query, with notifications sent back only if a query answer changes. In connection with the federated presence component 708, information fetched is low-level presence information such as location change, with presence updates propagated to the application. Logic can be implemented within application service to make use of low-level presence information. Additionally, the raw presence component 710 fetches information from different presence systems (for example, enterprise presence, service provider, consumer presence, etc.). Information fetched is low-level presence information such as location change, and logic can be implemented within application service to make use of low-level presence information.

With presence virtualization, application and/or service development is facilitated because applications deal with high-level queries and do not need to worry about handling low-level presence updates. Additionally, scalability is enabled via communication between application and presence server limited to high-level query and answers (as opposed to propagating every notification from presence server to application). One or more embodiments of the invention include reduced communication at both an application as well as a presence server, and the application does not need to maintain low-level presence state. The techniques detailed herein can additionally include logic to combine presence events into a virtual entity, with high-level query running on a presence server, thereby lowering application server processing requirements. Performance acceleration can be made more effective when applied at a single point (that is, a presence server such as XML offload using DataPower). One or more embodiments of the invention also include re-usability of business logic across multiple applications, rather than each application re-developing the logic on its own.

As described herein, one or more embodiments of the invention can include a presence federation across enterprise along with its mobile providers. A mobile provider can inject presence information from a provider's network (such as, for example, user location, device status, etc.) into enterprise presence. Also, by way of example, internal extension numbers can be assigned to employee cell phones. Further, presence federation extends the benefits of presence-awareness beyond a single enterprise to enterprise partners. Additionally, presence federation allows enterprises to reach customers with presence-enabled services via a presence provider.

Figure 8:
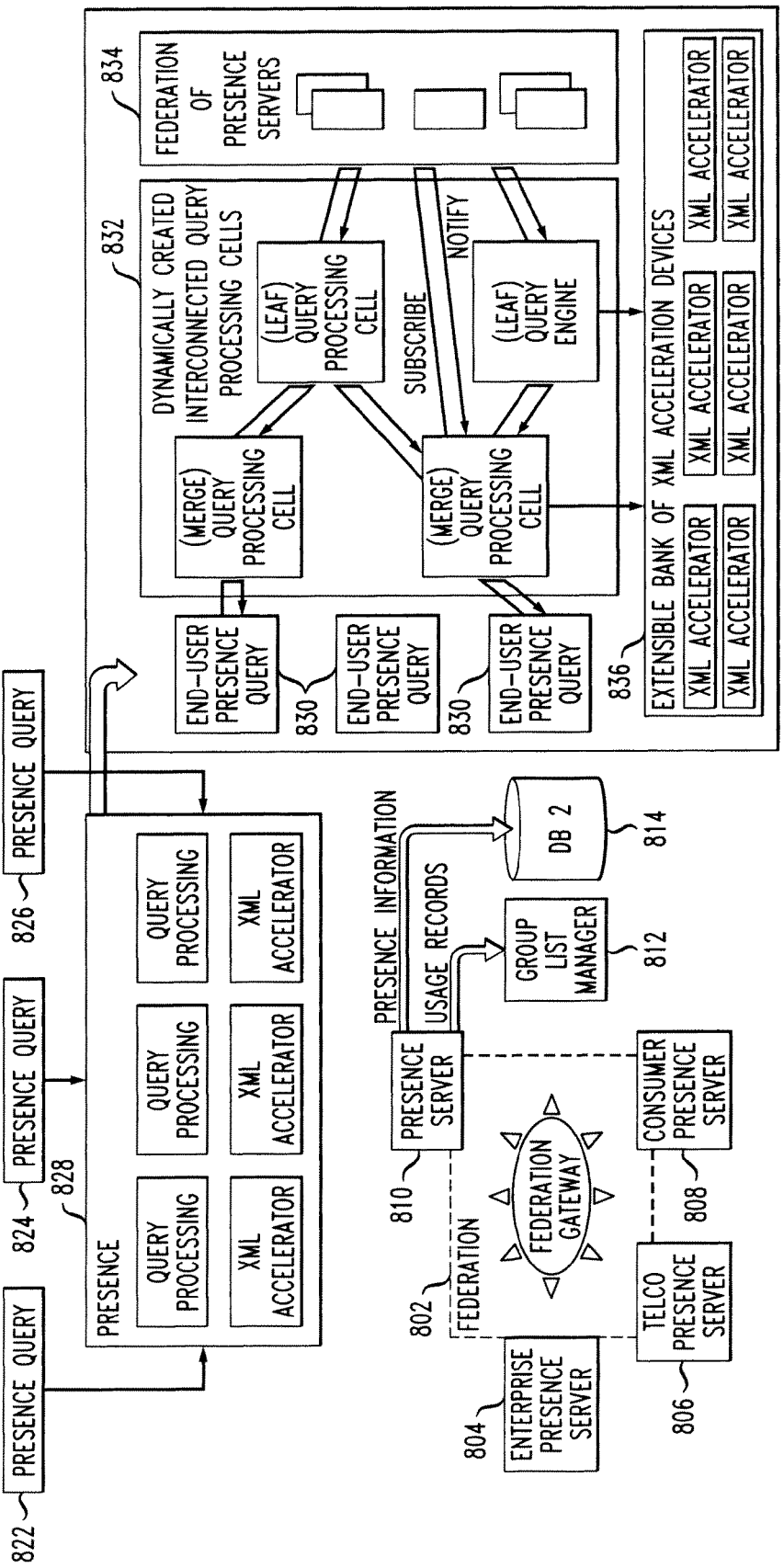
FIG. 8 is a diagram illustrating exemplary system architecture, according to an embodiment of the present invention.

FIG. 8 is a diagram illustrating exemplary system architecture, according to an embodiment of the present invention. By way of illustration, FIG. 8 depicts a federation component 802 including a federation gateway, which interacts with an enterprise presence server 804, a telco presence server 806, a consumer presence server 808 as well as a presence server 810. The presence server 810 provides usage records to a group list manager 812 and provides presence information to a database 814. FIG. 8 also depicts applications 816, business processes 818 and mobile services 820, which interact with presence queries 822, 824 and 826 to provide input to presence component 828 (which includes query processing components and XML accelerator components).

Additionally, FIG. 8 depicts end-user presence queries 830, which interact with (merge) query processing cells within a query processing cell component 832. Also, a (leaf) query processing cell, a (merge) query processing cell and a (leaf) query engine interact with a federation of presence servers 834. Further, a (merge) query processing cell and a (leaf) query engine interacts with an extensible bank of XML acceleration devices. The presence server 810 contains presence information that is federated across enterprise, Telco, and consumer domains and is used by the query processing cells to compute the query result in response to a presence query from end-applications (for example, components 816, 818 and 820). As explained above, the query processing cells themselves can interact with XML acceleration devices 836 to compute the query response to be sent as part of the notification.

Figure 9:
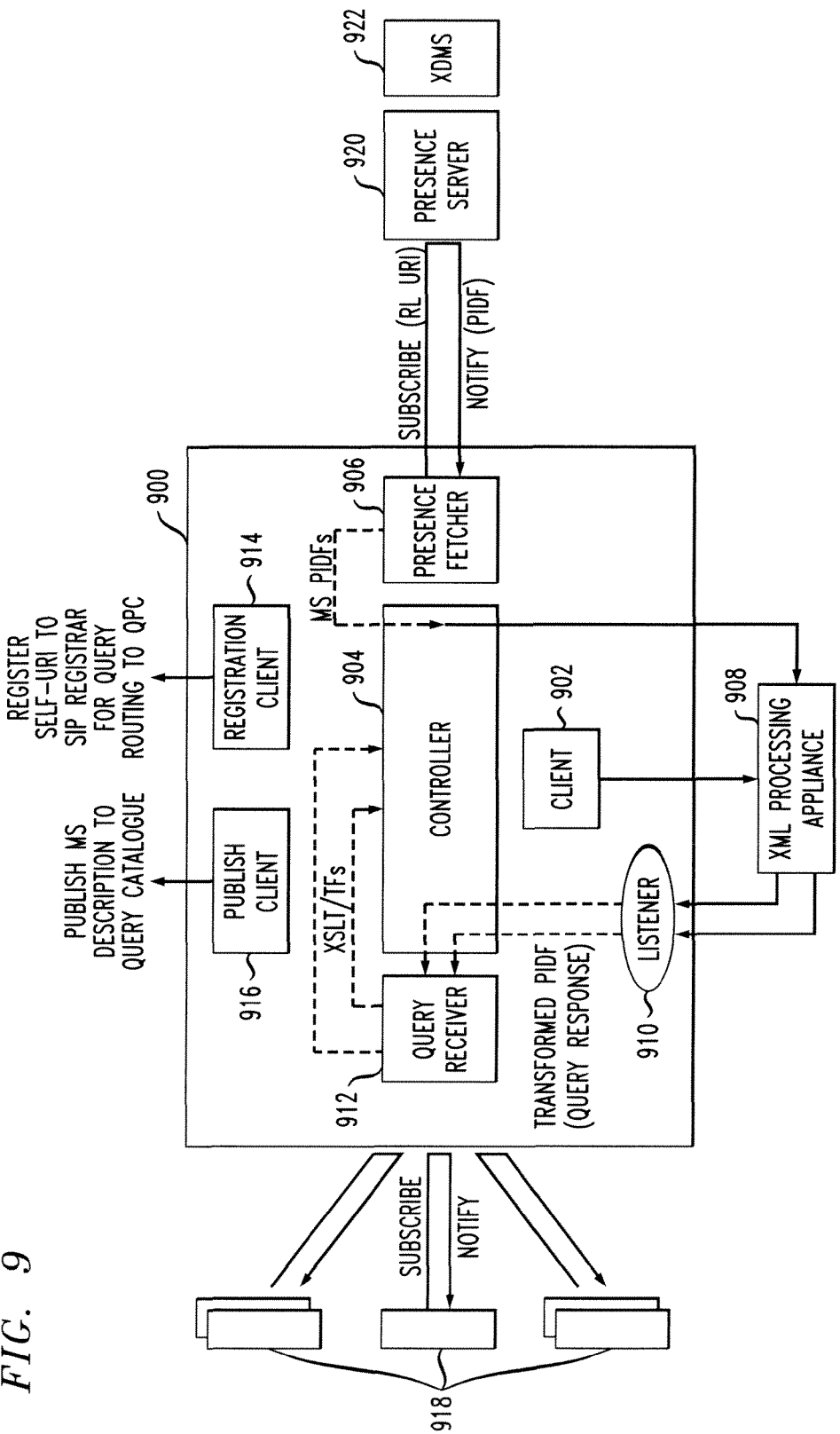
FIG. 9 is a diagram illustrating a query processing cell (QPC), according to an embodiment of the present invention.

FIG. 9 is a diagram illustrating a query processing cell (QPC), according to an embodiment of the present invention. By way of illustration, FIG. 9 depicts a QPC 900, which includes a client component 902, a listener component 910, a controller component 904, a presence fetcher component 906, a query receiver component 912, a registration client component 914 and a publish client component 916. FIG. 9 also depicts an XML processing appliance 908, a presence server 920, an XML data management server (XDMS) 922 and the end-user client 918.

As depicted in FIG. 9, the presence fetcher component 906 interacts with the presence server 920, and provides input to the controller component 904. The controller component and the client component 902 provide input to the XML processing appliance 908, which in turn provides input to the listener component 910. The listener component provides input to the query receiver component 912, which in turn provides input to the controller. Also, the registration client component 914 registers self-URI to SIP registrar for query routing to QPC, and the publish client component 916 publishes a MS description to a query catalogue. Further, the QPC interacts with end-user client 918.

A QPC serves as a building block of presence virtualization, a set of presence data and queries on that data. QPCs can be dynamically created and destroyed, and a QPC is initially created when no existing QPC can satisfy a newly arrived user query. In one or more embodiments of the invention, when a QPC is created, it subscribes to user-specified subset of presence data from the presence server (or from another QPC). Further queries can be installed within an existing QPC if these queries can be answered by the subscribed data in the QPC. QPCs allow application/service developers to use a higher-level presence primitive such as query/response.

QPCs are used to implement a scalable virtualization platform that can simultaneously support a large number of virtualization queries. A QPC can be a software object that effectively represents a virtual presentity (with a dynamically assigned URI) defined by a specific membership set (MS) such that its presence status is an aggregation of the presence data of individual members. Multiple queries with identical MS, but distinct TF, specifications can be mapped to the same QPC. Each of the TF components of queries mapped to a single QPC can then be viewed as subscriber-specific filters over this presence document. As detailed herein, a virtual presence server (VPS) can be viewed as a collection of QPCs, whose creation, termination and inter-QPC coordination are orchestrated by a QPC factory.

In an exemplary interaction model, a presence client specifies a query (in the body of a SIP SUBSCRIBE message) that is addressed to a well-known "VPS URI" (that is, that of the QPC factory) and thus routed by a standard SIP routing proxy to the VPS. The QPC factory can act as a container for creating and managing multiple individual QPCs, each representing a "virtual presentity" created by the VPS. The QPC factory is also responsible for redirecting virtualization queries to the appropriate QPC and for maintaining life-cycles of QPCs (for example, performing clean-up of a QPC when it no longer has any valid client subscriptions). During the initialization of a QPC, the QPC factory sets up a dynamic resource list URI (containing all the URIs in the MS) on a group list management server (GLMS). A QPC uses this GLMS URI to efficiently retrieve the raw presence data from the PS (rather than create per-URI subscriptions).

An additional component of the VPS is the query catalogue, which contains the repository for currently running virtualization queries. By exposing the contents of this catalogue through a Web-based interface, the VPS allows clients to reuse existing queries and QPC objects. To do so, the QPC factory maintains a unique tuple (that is, [MS, TF, QPC URI, TFid]) for each query in the query catalogue. On receiving the ith incoming query, represented by (MSi, TFi), the QPC factory first inspects the entries in the query catalogue to determine if a virtual presentity (URI) exists for an identically matching MS. If a match does not exist, the QPC factory creates a new QPC object (instantiated with a newly specified virtual presentity URI) and installs a GLMS group list (with the virtual presentity URI) containing the individual URIs of the membership set. If, on the other hand, a matching QPC exists, the QPC factory simply issues a SIP REDIRECT message to the client, asking it to reissue its SUBSCRIBE message to the existing virtual presentity (QPC) URI.

Further, to improve system scalability, each QPC offloads some of the query computation (involving manipulation of XML-based presence content) to an XML processing appliance. Whenever the computed result changes, each QPC uses SIP NOTIFYs to inform the end clients of a new response to their query.

Internally, each QPC can include, as detailed in FIG. 9, the following components. A presence fetcher component 906 interacts with the presence server 920 to setup subscriptions on the underlying presence server and obtain the presence documents of each of the members of the MS. A controller component 904 takes the different TF requests from all clients mapped to the same QPC, and interfaces with the XML processing appliance 908 to efficiently apply the XSLT transformations to the aggregated presence data of the MS (obtained by the presence fetcher). Also, a query receiver component 912 manages the external subscriptions issued by the virtualization query clients, which includes handling the SIP-based requests (SUBSCRIBEs) from the clients of this QPC, and for issuing NOTIFYs (containing the results of XSLT transforms) to the QPC's clients.

Figure 10:
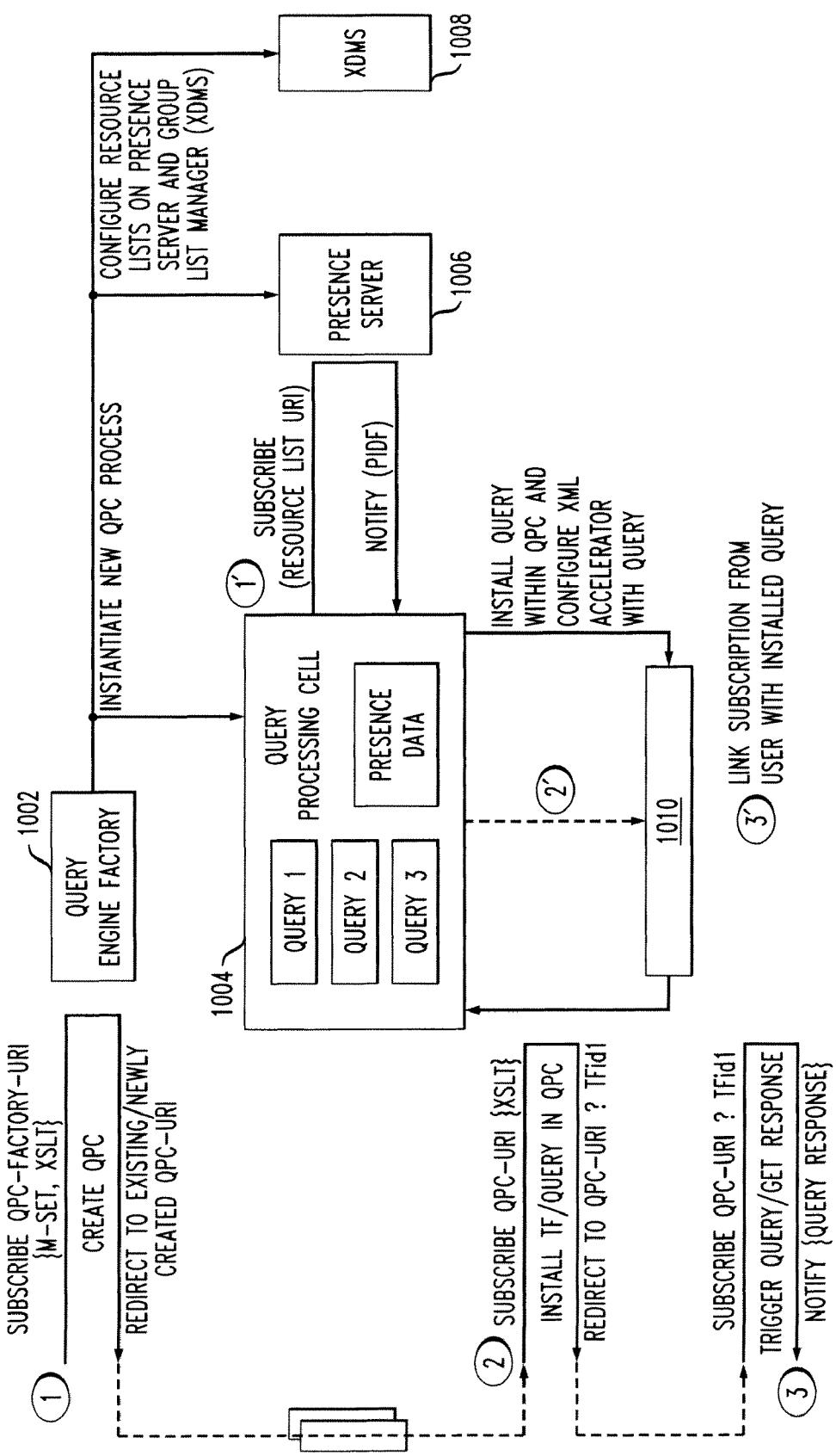
FIG. 10 is a diagram illustrating creation of a query processing cell, according to an embodiment of the present invention.

FIG. 10 is a diagram illustrating creation of a query processing cell, according to an embodiment of the present invention. By way of illustration, FIG. 10 depicts a query engine factory 1002, a query processing cell 1004 (which includes queries and presence data), a presence server 1006, an XDMS 1008 and an XML accelerator 1010. As also depicted in FIG. 10, step 1 includes creating a QPC, step 2 includes installing TF/query in the QPC and step 3 includes triggering the query to get a response. Additionally, step 1' includes instantiating a new QPC process and configuring resource lists on the presence server and group list manager (XDMS). Step 2' includes installing a query within the QPC and configuring the XML accelerator with the query. Also, step 3' includes linking the subscription from the user with the installed query.

One or more embodiments of the invention can additionally include using interactions between and with the various VPS components to make optimal use of existing features and components of the SIP-based infrastructure that would be already deployed in an existing network. By way of example, the techniques described herein include making efficient use of bulk subscriptions to the PS, maximizing the reuse of query components among different clients, and mitigating the processing overhead.

GLMS is a component of the converged signaling network that provides the ability to efficiently store and managing resource lists (for example, buddy lists). The resource lists are created, modified and deleted using the XML Configuration Access Protocol (XCAP). To enable more efficient specification of subscriptions to the presence server (PS), the MS component of a query can be configured as a resource-list in GLMS. The VPS (in specific, the QPC factory) is responsible for interacting with the GLMS to associate a dynamic resource-list URI with the URIs of the presentities addressed by the query, and for interacting with a presence server (using standard SUBSCRIBE-NOTIFY messages) to obtain the presence data for this set of presentities.

The GLMS also supports an internal presence service, through which an external module can subscribe to changes in status of group lists (for example, addition/deletion of elements to a list, deletion of list). The PS exploits the above-mentioned functionality of GLMS to accept SIP-based subscriptions to resource-lists. In particular, the PS, upon receiving a resource-list (MS) SUBSCRIBE message from a client, uses XCAP to retrieve the list of elements from GLMS and then subscribes to GLMS to be notified whenever there are modifications to the resource list. Internally, it subscribes to the presentities in the MS, gets notified of any changes in the presence documents of an MS member, and sends back any changes inside a NOTIFY message to the client (that is, the VPS). The presence document inside the NOTIFY can be an aggregated (PIDF) document containing the individual presence data of each MS member. The presence fetcher within the QPC subscribes to this resource-list URI to obtain aggregated presence information of MS, rather than maintain per-URI subscriptions.

As detailed herein, one or more embodiments of the invention include virtualization query routing to QPCs. By appropriate use of standard SIP URI qualifiers and session redirection, the VPS allows different clients to interact with it in different ways, without requiring any modifications to the client-side SIP stack.

By way of example, a query client can issue its query (a SIP SUBSCRIBE with a (MS, TF) tuple in the body of the message) addressed to the QPC Factory URI. If a QPC corresponding to the MS exists, the client will be redirected to the QPC URI; else, a new QPC object will be created on-demand by the QPC Factory (with a dynamically allocated URI from the URI space managed by the QPC Factory), and the query client will be redirected to this new URI. The (MS, TF) query is then routed by the query router to the query receiver module of the QPC. To promote reuse, each TF being currently supported by the client is identified by a "query component" label (a "?id" suffix appended to the URI for the QPC).

As before, if the TF exists, the query client is again redirected to the "sip:qpcURI?TFid" URI; else, the QPC Controller creates the corresponding TF transformation logic (on the XML processing Engine), generates a new "TFid" and then redirects the client to this URI. The (MS, TF) query addressed to a "sip:qpcURI?TFid" URI is then managed by the query receiver module of the QPC. The query catalog entries expose the existing (MS, TF, qpcURI, TFid) bindings to the external world. Accordingly, virtualization clients are able to reuse existing components on the VPS by directing their query to different URIs (for example, if there is an existing query with identical MS and TF components, the client can simply send its subscribe directly to the corresponding "sip:qpcURI?TFid" URI).

Additionally, XSLT-processing on a collection of XML documents can incur considerable processing overhead. To build a scalable XSLT-based presence virtualization platform, it is thus advantageous to improve the execution of the queries.

To implement a high-performance virtualization solution, one or more embodiments of the invention offload the bulk of the XML transformation and processing logic to a "wire-speed" XML processing appliance (referred to as XML engine). The QPC interfaces to the XML processor through a Web-services-based interface. Each QPC in effect installs a distinct firewall service on the XML engine, and each firewall policy is identified by a specific (name, port) combination. To support multiple XSLT-based TFs emanating from query clients transforming a common MS, the QPC installs multiple TFs onto the firewall policy that can be applied in parallel (logically) on the arriving MS data. The QPC can additionally spawn a hypertext transfer protocol (HTTP) listener for the response of each TF (XSLT) from the XML engine.

Recall that the presence fetcher is initialized to receive an aggregated presence document as part of a NOTIFY each time the presence information of any MS member changes. On receiving the NOTIFY, the QPC ships this merged XML document to the XML engine and receives a response (for example, as a transformed PIDF document) from the firewall policy. The query receiver then transmits the response (corresponding to the output of the corresponding TF filter applied to the virtual presentity) via NOTIFY messages to the client.

Figure 11:
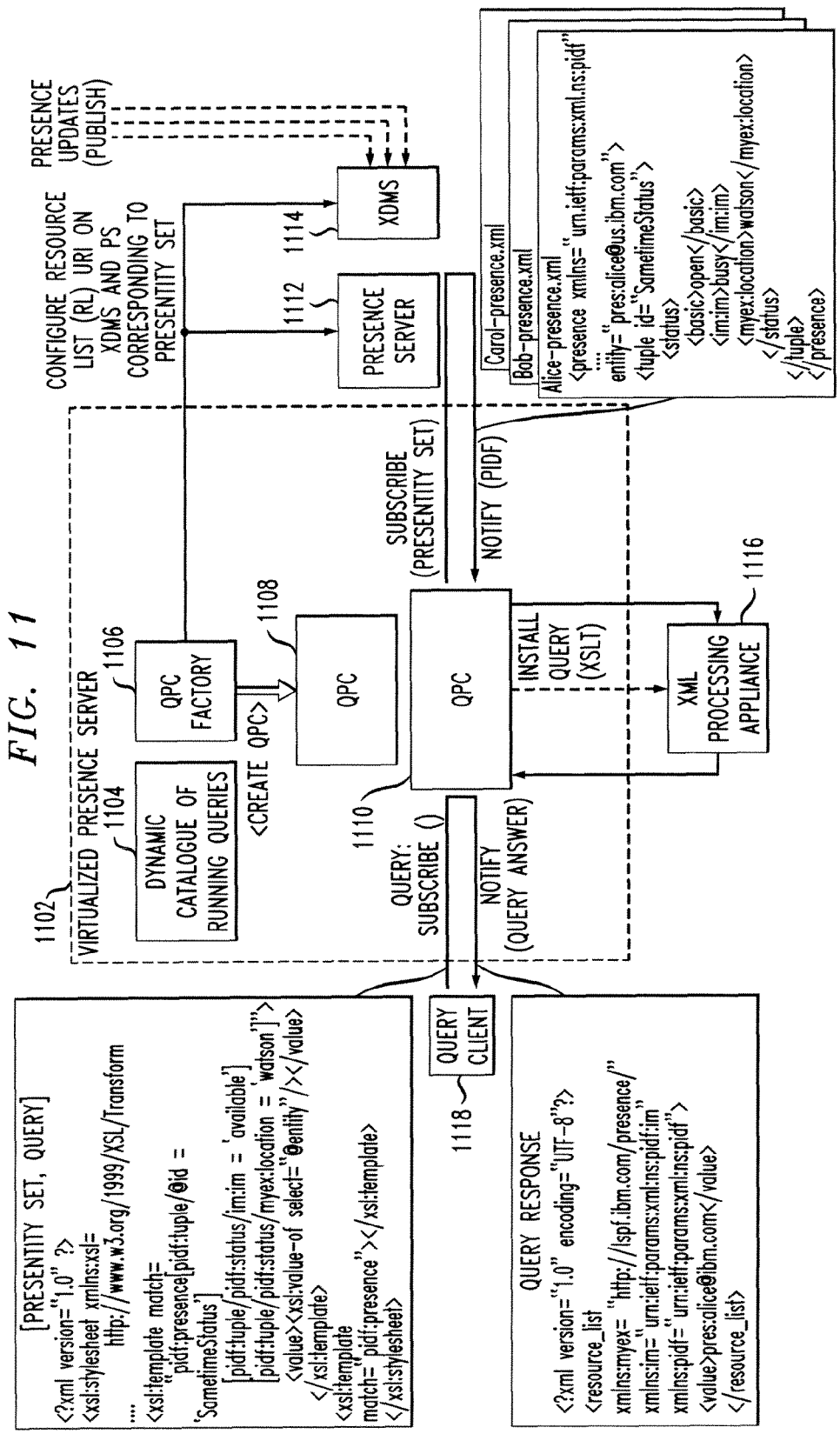
FIG. 11 is a diagram illustrating query execution, according to an embodiment of the present invention.

FIG. 11 is a diagram illustrating query execution, according to an embodiment of the present invention. By way of illustration, FIG. 11 depicts a VPS 1102, which includes a dynamic catalogue of running queries 1104, and a QPC factory 1106 that creates QPCs 1108 and 1110. FIG. 11 also depicts a presence server 1112, an XDMS 1114, an XML processing appliance 1116 and a query client 1118. As depicted in FIG. 11, the QPC factory 1106 configures a resource list (RL) URI on XDMS and PS corresponding to the presentity set and provides input to the presence server 1112 and XDMS 1114. Also, the QPCs 1108 and/or 1110 interact with the XML processing appliance 1116 (for example, installing a query).

In one or more embodiments of the invention, the VPS includes a single QPC factory with multiple QPCs that are created, managed and destroyed on-demand. Each QPC is instantiated with a resource-list URI that denotes the Membership Set (MS) of the virtual query, and one or more transformation functions (TFs) to be applied to the presence documents of the MS members. The VPS can be implemented, for example, in Java. Query clients can interact with a QPC factory through the west-bound interface of the VPS, providing the membership set (list of presentity URIs) and the transformation function (TF) in the payload of a SIP SUB- SCRIBE message. The QPC Factory redirects the client to the URI of a newly created QPC or a pre-existing QPC.

Each QPC includes a query receiver that is responsible for the subsequent interactions of the query client with the QPC. Note that, for example, a client can subscribe to an installed transformation function by passing the identifier of the transform along with a SUBSCRIBE message. The QPC registers the client as a "watcher" on the TF. Subsequently, the QPC sends out any new response received from the XML engine to watchers subscribed to the corresponding TFid. The body of the NOTIFY message to the query client contains the new response.

An implemented VPS infrastructure can include vendor-specific implementations of GLMS and presence server to operate with the QPCs. The presence fetcher in the QPC can sit, for example, at the east-bound interface and subscribe to all presentities in the membership set. The presence server manages these subscriptions and sends an initial aggregated NOTIFY to the presence fetcher corresponding to the MS. Subsequent NOTIFYs contain presence updates of individual members. The presence fetcher parses the NOTIFY and extracts the presence document for each presentity. It then merges these documents into a well-formed XML document to be shipped to the XML appliance.

Each QPC can have, for example, a south-bound interface that communicates with the firewall service installed at the XML appliance. Each firewall (one for each TF/XSLT) is responsible for handling XML transformations on incoming data and sending back the transformed responses to the appropriate HTTP listener of the QPC. These responses are then picked up by the query receiver that notifies the corresponding "watcher" clients.

Finally, all QPC objects (and their internal TF transformations) are maintained as "soft-state" in accordance with the base SIP protocols. This implies that each subscription has a specified duration and must be periodically refreshed. The QPC factory and QPC objects maintain the timers to perform the necessary clean-up. In particular, a QPC object has the ability to self-destroy when the number of active subscriptions for its MS drops to zero. At this point, the QPC factory removes the QPC, releases the virtual presentity URI and removes the corresponding entry created in the GLMS. Similarly, the QPC factory and QPC coordinate to ensure that the query catalogue is kept updated, as individual TF subscriptions for a specific QPC expire.

Figure 12:
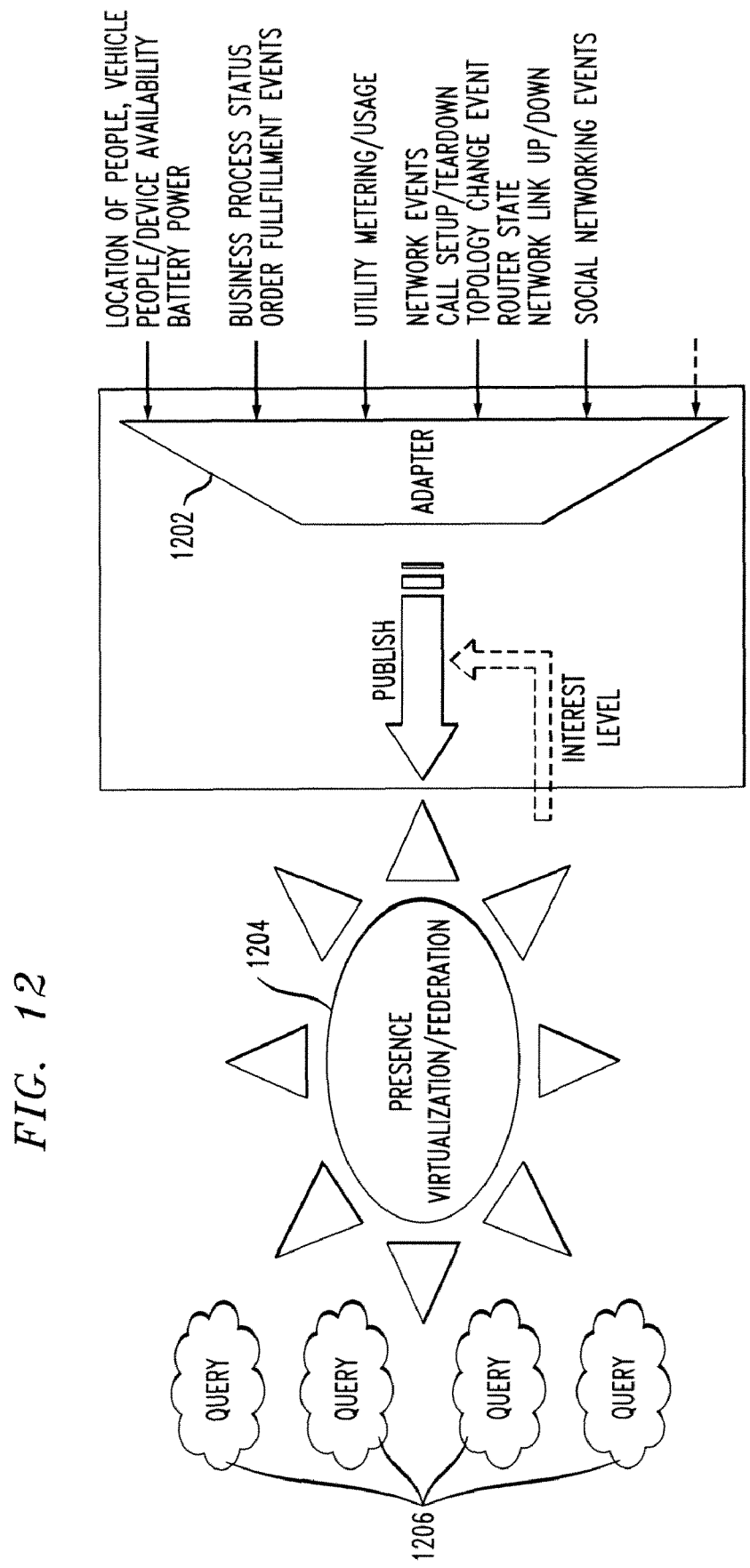
FIG. 12 is a diagram illustrating supporting multiple use-case domains, according to an embodiment of the present invention.

FIG. 12 is a diagram illustrating supporting multiple use-case domains, according to an embodiment of the present invention. By way of illustration, FIG. 12 depicts a presence adapter 1202, a presence virtualization/federation component 1204 and queries 1206. The presence adapter 1202 transforms real-world events (from use-case domain) into presence events (for example, PUBLISH). Real-world events can include, for example, location of people, vehicle/people/device availability, battery power, business process status, order fulfillment events, utility metering/usage, network events, call setup/teardown, topology change, event router state, network link up/down, social networking events, etc. The adapter can also adaptively control rate of presence publication to help scalability.

As detailed herein, one or more embodiments of the invention include presence virtualization, which can include query capability on presence data, and representing the query as a virtual presence entity that others can subscribe to (for example, if a user create a 'nearest available expert' query, others can add it to their buddy list). One or more embodiments of the invention also include a middleware architecture for presence virtualization that allows applications to consume and compose real-time presence from various sources, specify their computation needs using XSLT-based transformations on the presence data, and compute responses to these queries using scalable XML processing technology.

Figure 13:
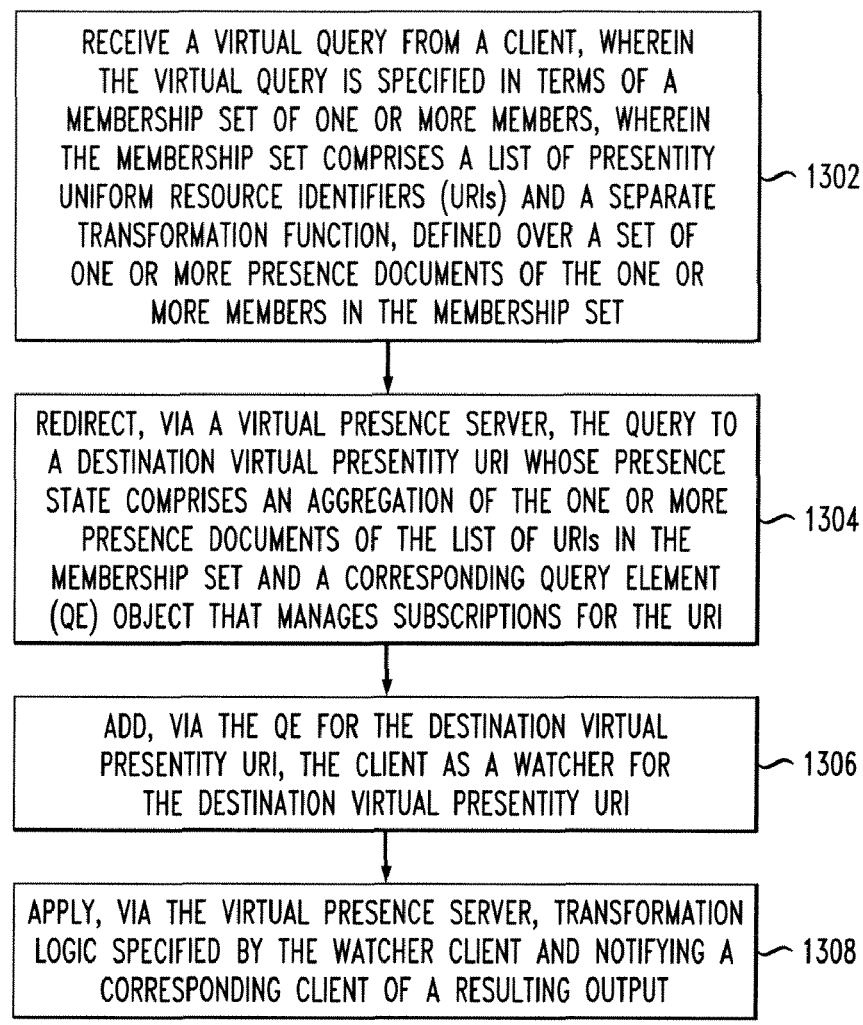
FIG. 13 is a flow diagram illustrating techniques for supporting a subscription-style presence virtualization query, according to an embodiment of the invention.

FIG. 13 is a flow diagram illustrating techniques for supporting a presence virtualization query (for example, a subscription-style presence virtualization query), according to an embodiment of the present invention. Step 1302 includes receiving a virtual query from a client (for example, any presence-enabled client), wherein the virtual query is specified in terms of a membership set of one or more members, wherein the membership set comprises a list of presentity uniform resource identifiers (URIs) and a separate transformation function, defined over a set of one or more presence documents of the one or more members in the membership set. The transformation function can be defined as a set of operators belonging to an extensible markup language (XML) manipulating language, wherein the XML can include XQuery and/or extensible stylesheet language transformation (XSLT). By way of example, specifying the membership set of the virtual query can include specifying an explicit list of individual URIs, specifying a URI indicating a list of URIs and/or specifying a selection predicate over a list of URIs.

Step 1304 includes redirecting, via a virtual presence server, the (via the client reissuing its query) query to a destination virtual presentity URI whose presence state comprises an aggregation of the one or more presence documents of the list of URIs in the membership set and a corresponding query element (QE) object that manages subscriptions for the URI.

Step 1306 includes adding, via the QE for the destination virtual presentity URI, the client as a watcher for the destination virtual presentity URI. Adding the client as a watcher for the destination virtual presentity URI can include receiving a redirected request from the client, creating (via the QE) an identifier to represent the query on the membership set, redirecting (via the QE) the client to re-issue a SUBSCRIBE message to the destination virtual presentity URI with the query identifier (ID) as a parameter, and upon receiving the redirected request from the client, adding, via the virtual presence server, the client as a watcher for that virtual presentity URI (and noting the query id the watcher is interested in). Further, upon receiving notifications on an update of the presence state of the virtual presentity, one or more embodiments of the invention include applying, via the QE, a separate transformation logic for each unique query ID and notifying (via the QE) the querying client associated with the ID of a resulting output. One or more embodiments of the invention additionally include reusing (via the QE) an existing identifier corresponding to an identical transformation query specification and associating multiple clients with an existing identifier, and notifying (via the QE) each querying client, associated with a particular ID, of the resulting output.

Step 1308 includes applying, via the virtual presence server, transformation logic specified by the watcher client and notifying a corresponding client (for example, any presence-based client that can cater this output to one or more presence-enabled applications) of a resulting output. Applying transformation logic specified by the watcher client can include applying the transformation logic in software and/or via use of one or more hardware accelerators to offload processing of the transformation logic.

The techniques depicted in FIG. 13 also include ensuring that there exists a destination virtual presentity URI and a corresponding QE. Ensuring that there exists a destination virtual presentity URI and a corresponding QE further can include determining (via the VPS) if an existing virtual presentity URI corresponds to a subscription for retrieving the presence documents of each member in the membership set. If there is no existing virtual presentity URI that corresponds to a subscription for retrieving the presence documents of each member in the membership set, one or more embodiments include creating a dynamic URI for a newly created virtual presentity and instantiating a new QE to manage subscriptions to the newly created virtual presentity, generating subscriptions to a plurality of presence servers to retrieve the presence documents for each URI in the membership set and provide the presence documents to the new QE, and maintaining (for example, in a table) an association between the created URI, the corresponding QE and the generated subscriptions to the plurality of presence servers. Additionally, generating subscriptions to a plurality of presence servers can include defining a new group list in a data management server (for example, XDMS) and associating the new group list with the dynamically created URI, adding each presentity listed in the membership set to the group list, and issuing a group list subscription to the presence server.

One or more embodiments of the invention also include a system for a virtual presence server to support subscription-style presence virtualization queries (for example, issued to it by a plurality of clients). The system can include, by way of example, the following components:

a virtual presence server (VPS) to provide answers to subscription-style structured virtual presence queries from a plurality of clients, the VPS containing a table representing a mapping between each unique membership set of presentities, a corresponding virtual presentity uniform resource identifiers (URI) and a query element (QE) responsible for subscriptions to the URI;

set of query elements (QEs) contained in the VPS, each QE associated with a URI and containing a table of a list of clients whose transformations are expressed over an aggregated presence document of the URI and a specific transformation logic pertaining to each client; and a set of presence clients that issue virtual presence queries that are structured to contain a membership set containing a list of presentity URIs, and a separate transformation function defined over a set of presence documents of each member in the membership set.

The techniques depicted in FIG. 13 can also, as described herein, include providing a system, wherein the system includes distinct software modules, each of the distinct software modules being embodied on a tangible computer-readable recordable storage medium. The distinct software modules can include, for example, a presence server module, a virtual presence server module, a query engine module and a client module executing on a hardware processor.

Additionally, the techniques depicted in FIG. 13 can be implemented via a computer program product that can include computer useable program code that is stored in a computer readable storage medium in a data processing system, and wherein the computer useable program code was downloaded over a network from a remote data processing system. Also, in one or more embodiments of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 14:
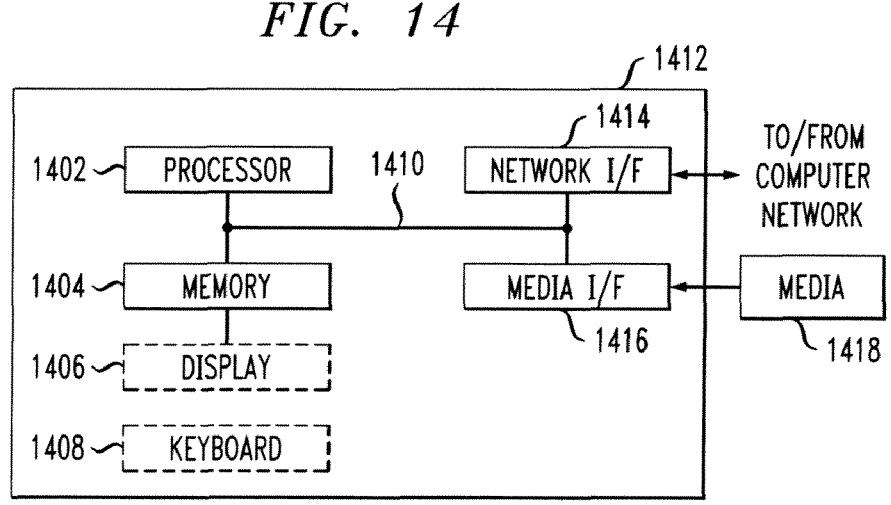
FIG. 14 is a system diagram of an exemplary computer system on which at least one embodiment of the invention can be implemented.

One or more embodiments can make use of software running on a general purpose computer or workstation. With reference to FIG. 14, such an implementation might employ, for example, a processor 1402, a memory 1404, and an input/output interface formed, for example, by a display 1406 and a keyboard 1408. The term "processor" as used herein is intended to include any processing device, such as, for example, one that includes a CPU (central processing unit) and/or other forms of processing circuitry. Further, the teen "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1402, memory 1404, and input/output interface such as display 1406 and keyboard 1408 can be interconnected, for example, via bus 1410 as part of a data processing unit 1412. Suitable interconnections, for example via bus 1410, can also be provided to a network interface 1414, such as a network card, which can be provided to interface with a computer network, and to a media interface 1416, such as a diskette or CD-ROM drive, which can be provided to interface with media 1418.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 1402 coupled directly or indirectly to memory elements 1404 through a system bus 1410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 1408, displays 1406, pointing devices, and the like) can be coupled to the system either directly (such as via bus 1410) or through intervening I/O controllers (omitted for clarity).

Network adapters such as network interface 1414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 1412 as shown in FIG. 14) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 1418 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction implementation system, apparatus, or device.

A computer readable signal medium may include a propagated data signal with computer readable program code embodied therein, for example, in baseband or as part of a earner wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction implementation system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be implemented substantially concurrently, or the blocks may sometimes be implemented in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed in the figures and corresponding text herein. The method steps can then be carried out using the distinct software modules and/or sub-modules of the system, as described above, executing on one or more hardware processors 1402. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural fowls as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one embodiment of the invention may provide one or more beneficial effects, such as, for example, enabling a VPS to support a set of virtual presence queries through instantiating a URI to represent the underlying presentities in a query and the association of multiple query transformations as client-specific filters on the same URI.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art.

What is claimed is:

1. A method for supporting a presence virtualization query, wherein the method comprises:
    receiving a virtual query from a client, wherein the virtual query is specified in terms of a membership set of one or more members, wherein the membership set comprises a list of presentity uniform resource identifiers (URIs) and a separate transformation function, defined over a set of one or more presence documents of the one or more members in the membership set;
    redirecting, via a virtual presence server, the query to a destination virtual presentity URI whose presence state comprises an aggregation of the one or more presence documents of the list of URIs in the membership set and a corresponding query element (QE) object that manages subscriptions for the URI;
    adding, via the QE for the destination virtual presentity URI, the client as a watcher for the destination virtual presentity URI;
    applying, via the virtual presence server, transformation logic specified by the watcher client and notifying a corresponding client of a resulting output; and
    ensuring that there exists a destination virtual presentity URI and a corresponding QE by determining if an existing virtual presentity URI corresponds to a subscription for retrieving the one or more presence documents of each member in the membership set.

2. The method of claim 1, wherein ensuring that there exists a destination virtual presentity URI and a corresponding QE further comprises:
    if there is no existing virtual presentity URI that corresponds to a subscription for retrieving the one or more presence documents of each member in the membership set:
        creating a dynamic URI for a newly created virtual presentity and instantiating a new QE to manage one or more subscriptions to the newly created virtual presentity;
        generating one or more subscriptions to a plurality of presence servers to retrieve the one or more presence documents for each URI in the membership set and provide the one or more presence documents to the new QE; and
        maintaining an association between the created URI, the corresponding QE and the generated subscriptions to the plurality of presence servers.

3. The method of claim 2, wherein generating one or more subscriptions to a plurality of presence servers comprises:
    defining a new group list in a data management server and associating the new group list with the dynamically created URI;
    adding each presentity listed in the membership set to the group list; and
    issuing a group list subscription to the presence server.

4. The method of claim 1, wherein adding, via the QE for the destination virtual presentity URI, the client as a watcher for the destination virtual presentity URI further comprises:
    receiving a redirected request from the client;
    creating an identifier to represent the query on the membership set;
    redirecting, via the QE, the client to re-issue a SUBSCRIBE message to the destination virtual presentity URI with the query identifier (ID) as a parameter; and
    upon receiving the redirected request from the client, adding, via the virtual presence server, the client as a watcher for that virtual presentity URI.

5. The method of claim 4, further comprising:
    upon receiving one or more notifications on an update of the presence state of the virtual presentity, applying, via the QE, a separate transformation logic for each unique query ID; and
    notifying the querying client associated with the ID of a resulting output.

6. The method of claim 5, further comprising:
    reusing an existing identifier corresponding to an identical transformation query specification and associating multiple clients with an existing identifier; and
    notifying each querying client, associated with a particular ID, of the resulting output.

7. The method of claim 1, wherein the transformation function is defined as a set of operators belonging to an extensible markup language (XML) manipulating language, wherein the XML comprises one of XQuery and extensible stylesheet language transformation (XSLT).

8. The method of claim 1, wherein applying transformation logic specified by the watcher client comprises applying the transformation logic in at least one of software, and via use of one or more hardware accelerators to offload processing of the transformation logic.

9. The method of claim 1, wherein specifying the membership set of the virtual query comprises at least one of specifying an explicit list of individual URIs, specifying a URI indicating a list of URIs and specifying a selection predicate over a list of URIs.

10. The method of claim 1, further comprising providing a system, wherein the system comprises one or more distinct software modules, each of the one or more distinct software modules being embodied on a tangible computer-readable recordable storage medium, and wherein the one or more distinct software modules comprise a presence server module, a virtual presence server module, a query engine module and a client module executing on a hardware processor.

11. A system for a virtual presence server to support presence virtualization queries, the system comprising:
    a virtual presence server (VPS) to provide one or more answers to subscription-style structured virtual presence queries from a plurality of clients, the VPS comprising a table representing a mapping between each unique membership set of one or more presentities, a corresponding virtual presentity uniform resource identifiers (URI) and a query element (QE) responsible for subscriptions to the URI;
    a set of one or more query elements (QEs) contained in the VPS, each QE associated with a URI and containing a table of a list of one or more clients whose transformations are expressed over an aggregated presence document of the URI and a specific transformation logic pertaining to each client, and wherein existence of a destination virtual presentity URI and a corresponding QE is ensured by determining if an existing virtual presentity URI corresponds to a subscription for retrieving the one or more presence documents of each member in the membership set; and
    a set of one or more presence clients that issue virtual presence queries that are structured to contain a membership set containing a list of one or more presentity URIs, and a separate transformation function defined over a set of presence documents of each member in the membership set.

12. A computer program product comprising a non-transitory computer readable recordable storage medium including computer useable program code for supporting a presence virtualization query, the computer program product including:
    computer useable program code for receiving a virtual query from a client, wherein the virtual query is specified in terms of a membership set of one or more members, wherein the membership set comprises a list of presentity uniform resource identifiers (URIs) and a separate transformation function, defined over a set of one or more presence documents of the one or more members in the membership set;
    computer useable program code for redirecting, via a virtual presence server, the query to a destination virtual presentity URI whose presence state comprises an aggregation of the one or more presence documents of the list of URIs in the membership set and a corresponding query element (QE) object that manages subscriptions for the URI;
    computer useable program code for adding, via the QE for the destination virtual presentity URI, the client as a watcher for the destination virtual presentity URI; and
    computer useable program code for applying, via the virtual presence server, transformation logic specified by the watcher client and notifying a corresponding client of a resulting output; and
    computer useable program code for ensuring that there exists a destination virtual presentity URI and a corresponding QE by determining if an existing virtual presentity URI corresponds to a subscription for retrieving the one or more presence documents of each member in the membership set.

13. The computer program product of claim 12, wherein the computer useable program code for adding, via the QE for the destination virtual presentity URI, the client as a watcher for the destination virtual presentity URI further comprises:
    computer useable program code for receiving a redirected request from the client;
    computer useable program code for creating an identifier to represent the query on the membership set;
    computer useable program code for redirecting, via the QE, the client to re-issue a SUBSCRIBE message to the destination virtual presentity URI with the query identifier (ID) as a parameter; and
    computer useable program code for upon receiving the redirected request from the client, adding, via the virtual presence server, the client as a watcher for that virtual presentity URI.

14. The computer program product of claim 12, wherein the transformation function is defined as a set of operators belonging to an extensible markup language (XML) manipulating language, wherein the XML comprises one of XQuery and extensible stylesheet language transformation (XSLT).

15. The computer program product of claim 12, wherein the computer useable program code for applying transformation logic specified by the watcher client comprises computer useable program code for applying the transformation logic in at least one of software, and via use of one or more hardware accelerators to offload processing of the transformation logic.

16. The computer program product of claim 12, wherein the computer useable program code for specifying the membership set of the virtual query comprises at least one of computer useable program code for specifying an explicit list of individual URIs, computer useable program code for specifying a URI indicating a list of URIs and computer useable program code for specifying a selection predicate over a list of URIs.

17. The computer program product of claim 12, wherein the computer useable program code comprises one or more distinct software modules, and wherein the one or more distinct software modules comprise a presence server module, a virtual presence server module, a query engine module and a client module executing on a hardware processor.

18. A system for supporting a presence virtualization query comprising:
    a memory; and
    at least one processor coupled to the memory and operative to:
        receive a virtual query from a client, wherein the virtual query is specified in terms of a membership set of one or more members, wherein the membership set comprises a list of presentity uniform resource identifiers (URIs) and a separate transformation function, defined over a set of one or more presence documents of the one or more members in the membership set;

redirect, via a virtual presence server, the query to a destination virtual presentity URI whose presence state comprises an aggregation of the one or more presence documents of the list of URIs in the membership set and a corresponding query element (QE) object that manages subscriptions for the URI;

add, via the QE for the destination virtual presentity URI, the client as a watcher for the destination virtual presentity URI;

apply, via the virtual presence server, transformation logic specified by the watcher client and notifying a corresponding client of a resulting output; and ensure that there exists a destination virtual presentity URI and a corresponding QE by determining if an existing virtual presentity URI corresponds to a subscription for retrieving the one or more presence documents of each member in the membership set.

19. The system of claim 18, wherein the at least one processor coupled to the memory operative to add, via the QE for the destination virtual presentity URI, the client as a watcher for the destination virtual presentity URI is further operative to:

receive a redirected request from the client;

create an identifier to represent the query on the membership set;

redirect, via the QE, the client to re-issue a SUBSCRIBE message to the destination virtual presentity URI with the query identifier (ID) as a parameter; and upon receiving the redirected request from the client, add, via the virtual presence server, the client as a watcher for that virtual presentity URI.

20. The system of claim 18, wherein the transformation function is defined as a set of operators belonging to an extensible markup language (XML) manipulating language, wherein the XML comprises one of XQuery and extensible stylesheet language transformation (XSLT).

21. The system of claim 18, wherein the at least one processor coupled to the memory operative to apply transformation logic specified by the watcher client is further operative to apply the transformation logic in at least one of software, and via use of one or more hardware accelerators to offload processing of the transformation logic.

22. The system of claim 18, wherein the at least one processor coupled to the memory operative to specify the membership set of the virtual query is further operative to, at least one of, specify an explicit list of individual URIs, specify a URI indicating a list of URIs and specify a selection predicate over a list of URIs.

* * * * *